US008014425B2

(12) United States Patent
Ekbal et al.

(10) Patent No.: US 8,014,425 B2
(45) Date of Patent: Sep. 6, 2011

(54) MULTIPLE ACCESS TECHNIQUES FOR A WIRELESS COMMUNIATION MEDIUM

(75) Inventors: Amal Ekbal, San Diego, CA (US); Chong U. Lee, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 11/560,716

(22) Filed: Nov. 16, 2006

(65) Prior Publication Data

US 2008/0117939 A1    May 22, 2008

(51) Int. Cl.
*H04J 3/06* (2006.01)
(52) U.S. Cl. ........ 370/517; 375/130; 375/140; 375/146; 375/259; 375/295; 375/354; 375/356
(58) Field of Classification Search .................. 375/130, 375/140, 146, 219, 259, 295, 354, 356; 370/517
See application file for complete search history.

(56) References Cited

U.S. PATENT DOCUMENTS

| 5,361,070 | A | 11/1994 | McEwan |
|---|---|---|---|
| 5,687,169 | A | 11/1997 | Fullerton |
| 5,764,696 | A | 6/1998 | Barnes et al. |
| 5,812,081 | A | 9/1998 | Fullerton |
| 5,832,035 | A | 11/1998 | Fullerton |
| 5,907,427 | A | 5/1999 | Scalora et al. |
| 5,952,956 | A | 9/1999 | Fullerton |
| 5,960,031 | A | 9/1999 | Fullerton et al. |
| 5,963,581 | A | 10/1999 | Fullerton et al. |
| 5,969,663 | A | 10/1999 | Fullerton et al. |
| 5,995,534 | A | 11/1999 | Fullerton et al. |
| 6,031,862 | A | 2/2000 | Fullerton et al. |
| 6,091,374 | A | 7/2000 | Barnes |
| 6,111,536 | A | 8/2000 | Richards et al. |
| 6,133,876 | A | 10/2000 | Fullerton et al. |
| 6,177,903 | B1 | 1/2001 | Fullerton et al. |
| 6,218,979 | B1 | 4/2001 | Barnes et al. |
| 6,295,019 | B1 | 9/2001 | Richards et al. |
| 6,297,773 | B1 | 10/2001 | Fullerton et al. |
| 6,300,903 | B1 | 10/2001 | Richards et al. |
| 6,304,623 | B1 | 10/2001 | Richards et al. |

(Continued)

FOREIGN PATENT DOCUMENTS

EP    1303056    4/2003

(Continued)

OTHER PUBLICATIONS

International Search Report—PCT/US07/085029—International Search Authority, European Patent Office—Sep. 1, 2008.

(Continued)

*Primary Examiner* — Leon Flores
(74) *Attorney, Agent, or Firm* — Dang M. Vo

(57) ABSTRACT

A multiple access technique for a wireless communication system establishes separate channels by defining different time intervals for different channels. In a transmitted reference system different delay periods may be defined between transmitted reference pulses and associated data pulses for different channels. In addition, a multiple access technique may employ a common reference pulse for multiple channels in a transmitted reference system. Another multiple access technique assigns different pulse repetition periods to different channels. One or more of these techniques may be employed in an ultra-wide band system.

57 Claims, 16 Drawing Sheets

U.S. PATENT DOCUMENTS

| | | |
|---|---|---|
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,810,087 B2 | 10/2004 | Hoctor et al. |
| 6,822,604 B2 | 11/2004 | Schantz et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,068,715 B2 * | 6/2006 | Hoctor et al. ............ 375/239 |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,529,300 B2 | 5/2009 | Richards |
| 7,580,380 B2 | 8/2009 | Baker et al. |
| 7,590,198 B2 | 9/2009 | Sanada et al. |
| 2004/0202230 A1 | 10/2004 | Dowla et al. |

FOREIGN PATENT DOCUMENTS

| | | |
|---|---|---|
| WO | WO2005018159 | 2/2005 |
| WO | 2005112289 | 11/2005 |
| WO | 2006072378 | 7/2006 |

OTHER PUBLICATIONS

Written Opinion—PCT/US07/085029—International Search Authority, European Patent Office—Sep. 1, 2008.

International Search Authority, Partial International Search Report, PCT/US07/085029, May 14, 2008, European Patent Office.

International Preliminary Report on Patentability—PCT/US07/085029, IPEA, European Patent Office, Mar. 10, 2009.

* cited by examiner

MULTIPLE ACCESS TECHNIQUES FOR A WIRELESS COMMUNIATION MEDIUM

CROSS-REFERENCE TO RELATED APPLICATION

This application is related to concurrently filed and commonly owned U.S. patent application Ser. No. 11/560,740, entitled "MULTIPLE ACCESS TECHNIQUES FOR A WIRELESS COMMUNICATION MEDIUM,".

BACKGROUND

1. Field

This application relates generally to communications, and to techniques that enable multiple devices to access a wireless medium.

2. Background

In a wireless communication system multiple wireless devices may communicate with one another via signals having frequencies within a given radio frequency band. Here, provisions may be made to prevent transmissions from one device from interfering with transmissions from another device. For example, some systems employ media access control that allows only one device to use a given medium (e.g., a radio frequency band) at a time. One way of accomplishing this is to require that each device check the medium to determine whether another device is currently transmitting over the medium. If the medium is in use, the device will delay transmitting until a later time when the medium is not in use. Alternatively, some systems use a signaling technique such as spread spectrum that modifies transmitted signals to reduce the likelihood of transmissions from one device interfering with simultaneous transmissions of another device within the same frequency band.

Techniques such as these may be employed in a variety of wireless communication systems. An example of such a wireless communication system is an ultra-wide band system. In some implementations an ultra-wide band system may employ pulse signaling and bandwidths on the order of 500 MHz or more.

Various multiple access schemes have been proposed for use in ultra-wide band systems. One example is code division multiple access ("CDMA") incorporating direct sequence, time hopping or an appropriate combination of these two schemes. Another example is frequency division multiple access ("FDMA"). Use of the ALOHA family of ad hoc multiple access techniques also have been proposed, for example, for intra-piconet conflict resolution. Chaos-based ultra-wide band systems have been proposed that use length division multiple access ("LDMA") by varying the time duration of the ultra-wide band pulse.

In a typical application an ultra-wide band system is used for communication over relatively short distances. For example, ultra-wide band technology may be employed in a physical layer implementation for a body area network ("BAN") or a personal area network ("PAN"). A wide variety of wireless devices having different power and data rate requirements may be deployed in such a BAN or a PAN. Consequently, various ultra-wide band receiver design approaches may be employed. For example, a receiver design may employ a coherent RAKE receiver design, a non-coherent energy detector design, or a transmitted reference design. Given the disparate requirements of applications such as these, a need exists for effective and adaptable multiple access techniques for wireless communications.

SUMMARY

A summary of selected aspects of the disclosure follows. For convenience, one or more aspects may be referred to herein simply as "an aspect" or "aspects."

In some aspects a multiple access technique for a wireless system defines different time intervals for different channels that concurrently access a common and wireless medium. For example, in a pulse-based wireless system, pulses for one channel are separated by a given time period or periods while pulses for another channel are separated by a different time period or periods. Through the use of such a technique two or more devices (e.g., associated with one or more users) may communicate via two or more concurrently active channels.

In some aspects a multiple access technique is provided for a transmitted reference system. Here, different delay periods may be defined between transmitted reference pulses and associated data pulses for different channels. For example, in a system that utilizes a fixed delay period between a reference pulse and an associated data pulse, one delay period is defined for one channel and a different delay period is defined for another channel. In a system that utilizes multiple delay periods between a reference pulse and an associated data pulse, one set of delay periods is defined for one channel and a different set of delay periods is defined for another channel. In a system that utilizes adjustable delay periods between a reference pulse and an associated data pulse, one delay adjust sequence is defined for one channel and a different delay adjust sequence is defined for another channel.

In some aspects a multiple access technique uses a common reference pulse for multiple channels. For example, a system may generate a reference pulse followed by two data pulses. Here, a first data pulse associated with a first channel may follow the reference pulse by a delay period defined for the first channel. A second data pulse associated with a second channel follows the reference pulse by a different delay period defined for the second channel.

In some aspects a multiple access technique defines different pulse repetition periods for different channels. For example, pulses transmitted over one channel may be separated by one pulse repetition period while pulses transmitted over another channel may be separated by a different pulse repetition period. The pulse repetition period for a given channel may be adjustable. In this case, different pulse repetition period sequences may be assigned to different channels. As an example, one pseudorandom pulse repetition period sequence may be assigned to one channel while a different pseudorandom pulse repetition period sequence may be assigned to another channel.

In some aspects a multiple access technique incorporating different pulse repetition periods may be implemented in a transmitted reference system. Here, one or more of the transmitted reference techniques described above also may be employed. For example, a system may define different channels through the use of different pulse repetition periods and different reference to data pulse delay periods.

In some aspects one or more of the above techniques may be employed in an ultra-wide band system. For example, multiple ultra-wide band channels may be defined by defining different pulse repetition periods and or different reference pulse to data pulse delay periods for each channel.

BRIEF DESCRIPTION OF THE DRAWINGS

These and other features, aspects and advantages of the disclosure will be more fully understood when considered with respect to the following detailed description, appended claims and accompanying drawings, wherein:

Figure 1:
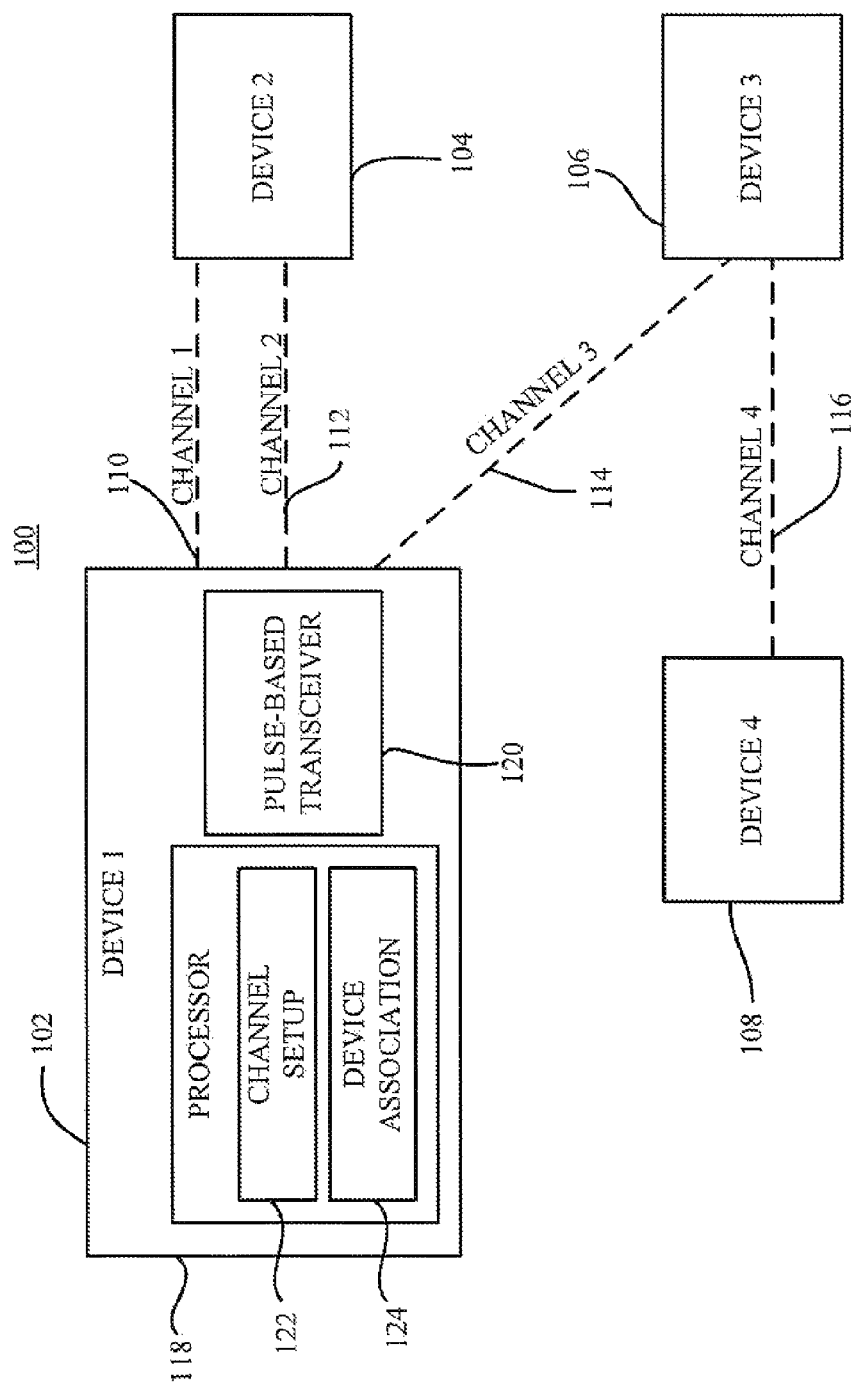
FIG. 1 is a simplified block diagram of several exemplary aspects of a communication system adapted to provide concurrent channels.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein.

A multiple access technique employed in a wireless communication system enables two or more devices to communicate over a shared communication medium. As an example, FIG. 1 illustrates certain aspects of a system 100 where several wireless communication devices 102, 104, 106 and 108 are adapted to establish wireless communication channels 110, 112, 114 and 116 with one another. To reduce the complexity of FIG. 1 selected aspects of the devices are only illustrated in conjunction with the device 102. It should be appreciated, however, that the devices 104, 106 and 108 may incorporate similar functionality.

In the example of FIG. 1, the devices 102, 104, 106 and 108 communicate via a pulsed-based physical layer. In some aspects the physical layer may utilize ultra-wide band pulses that have a relatively short length (e.g., on the order of a few nanoseconds) and a relatively wide bandwidth. In some aspects an ultra-wide band signal may be defined as a signal having a fractional bandwidth greater than approximately 20% or having a bandwidth greater than approximately 500 MHz.

In some aspects the system 100 may comprise a transmitted reference system. In this case, a device sends data by transmitting a reference pulse followed by an associated data pulse. A device that receives the pulses may then use the reference pulse as a "noisy matched filter" to detect the data represented by the data pulse.

The device 102 illustrates several components that may be used to establish and communicate over one or more channels. For example, a processor 118 may cooperate with a transceiver 120 to transmit signals over a channel and receive signals from a channel. Here, the processor 118 implements functionality 122 to set up a channel. This channel setup component 122 may be used to define and implement different signaling parameters (e.g., intervals between pulses) for different channels. The processor 118 also implements functionality 124 to associate with other devices so that each device will use the same signaling parameters to communicate over a given channel.

Advantageously, through the use of multiple access techniques as taught herein, the devices 102, 104, 106 and 108 may concurrently (e.g., simultaneously) utilize a shared medium. For example, the devices 102, 104, 106 and 108 may concurrently transmit signals within the same ultra-wide band frequency band. As depicted in FIG. 1, the device 102 may communicate with the device 104 via two or more concurrently operating channels (e.g., channels 110 and 112). In addition, the device 102 may concurrently communicate with multiple devices (e.g., devices 104 and 106) over different channels (e.g., channels 110 and 114). Furthermore, one set of devices (e.g., devices 102 and 104) may communicate via one channel (e.g., channel 110) while another set of devices (e.g., devices 106 and 108) concurrently communicate via another channel (e.g., channel 116).

The system 100 of FIG. 1 is provided as an example of one possible system that may employ a multiple access technique. It should be appreciated that the teachings herein may be incorporated into other types of systems implemented using various types of devices that support various communication techniques and protocols.

Exemplary operations that may be used to establish a channel and communicate over the channel will now be discussed in conjunction with the flowchart of FIG. 2. For convenience, the operations of FIG. 2 (or any other flowchart herein) may be described as being performed by specific components. It should be appreciated, however, that these operations may be performed in conjunction with and/or by other components.

Devices in a wireless communication system may be configured to establish a channel with another device by initially communicating over a known channel. Here, a wireless device seeking to establish a channel may send preliminary messages (e.g., polling messages) over the known channel. In addition, each device in the system may be configured to periodically scan the known channel for any preliminary messages.

Accordingly, as represented by block 202, the devices may configure their respective transceivers to initially use default parameter values for sending signals to and receiving signals from the wireless medium. For example, a device may set the pulse repetition period to a value defined for a known channel. In addition, in a transmitted reference system, the device may set the reference pulse to data pulse delay to a value defined for a known channel. Also, in an implementation that uses adjustable intervals for the known channel, the device may configure the transceiver to use a default sequence (e.g., a default pseudorandom sequence) for adjusting the intervals.

As represented by block 204, once preliminary communications are established between two or more devices over the known channel, the devices may perform an association procedure whereby the devices learn the respective capabilities of each device. Based on those capabilities, the devices may negotiate to establish a channel for subsequent communication.

As represented by block 206, one or more of the devices may select channel parameters to be used for the channel. These channel parameters may include, for example, one or more reference pulse to data pulse delay values, one or more pulse repetition periods, some other suitable parameter(s), or a combination of two or more of these parameters. As will be discussed in more detail below, in general, these channel parameters are selected to avoid or reduce the probability of interference with other channels in the communication system.

In some cases a device may unilaterally define the parameters to be used for a given channel. For example, the device may randomly select the channel parameters. Alternatively, the device may select channel parameters based on a set of one or more device-related parameters (e.g., a device address, a device location, a time of the day, etc.). In other cases a device may select a channel parameter based on information it has regarding the channel parameters of other channels that are or have been defined in the system (e.g., currently active channels). In any case, as represented by block 208, the device may send this channel parameter information to each device that will communicate over the channel.

Alternatively, in some cases a device may communicate with one or more other devices to define the channel parameters. For example, a device may select a channel based on information it obtains from other devices regarding the channel parameters of other channels defined in the system. In some cases, in conjunction with the association procedure two or more devices may negotiate to select the channel parameters.

As represented by block 210, once all of the devices have generated or obtained the selected channel parameters, the devices may set up their respective transceivers to transmit and receive signals in accordance with the selected channel parameters.

Figure 3:
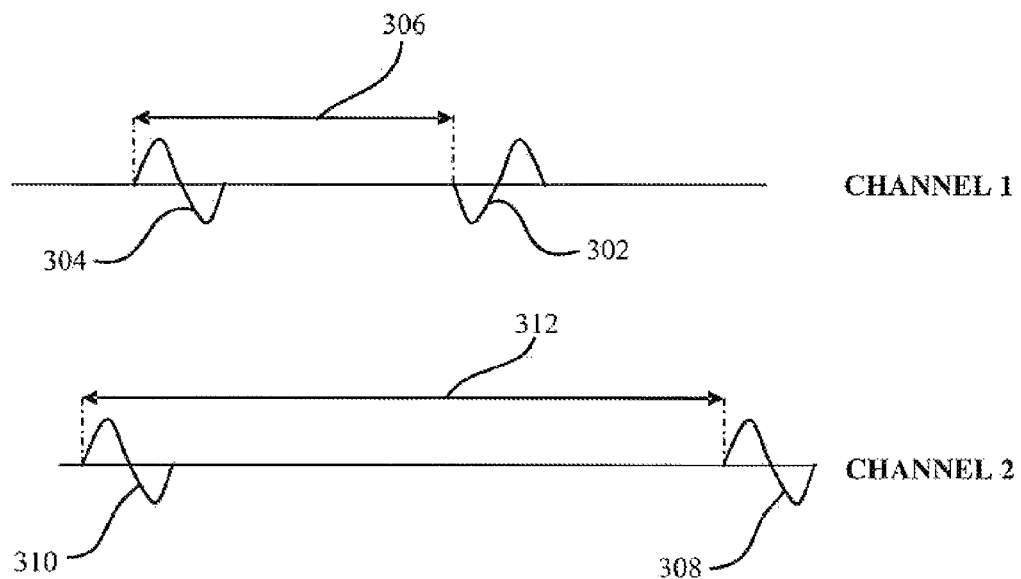
FIG. 3 is a simplified diagram illustrating an example of different reference pulse to data pulse delays for different channels.
Figure 4:
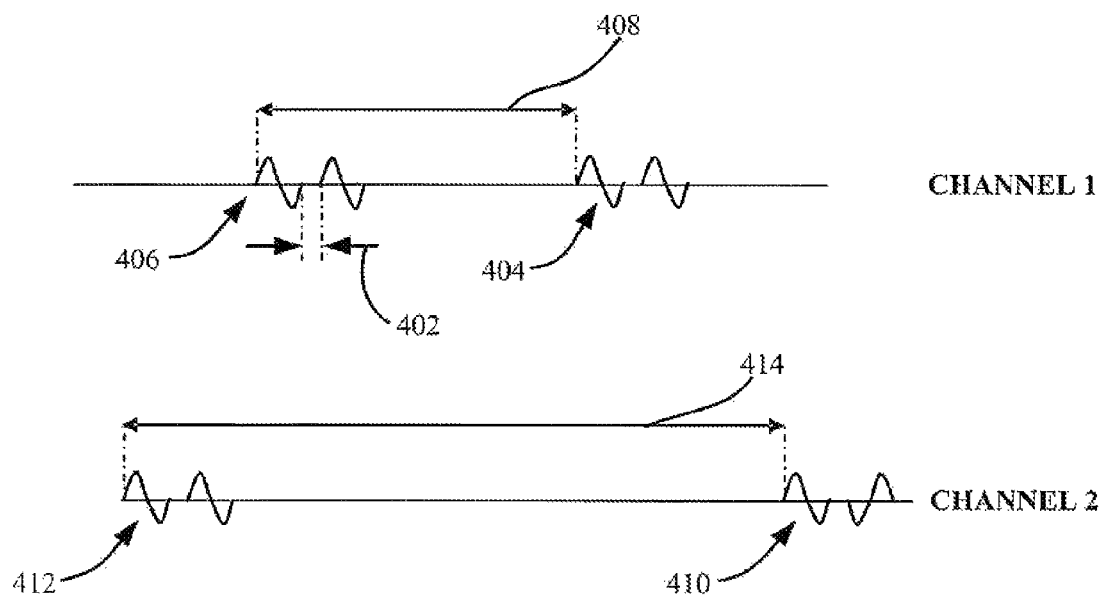
FIG. 4 is a simplified diagram illustrating an example of different pulse repetition periods for different channels.

Operations similar to those discussed above may be performed to establish and use other channels in the communication system. In this case, however, a wireless device may select different channel parameters at block 206 to establish a channel that may be used concurrently with other channels in the system. Here, the channel parameters (e.g., reference to data delay, pulse repetition period, adjustment sequence) for one or more channels may be selected such that concurrent channels may operate with relatively little interference between the signals (e.g., pulses) of the channels. FIGS. 3 and 4 illustrate two examples of signaling that may be used to establish concurrent channels.

FIG. 3 illustrates defining different reference pulse to data pulse delay periods for different channels. Referring to channel 1, a data pulse 302 follows a reference pulse 304 by a delay period 306. Referring to channel 2, a data pulse 308 follows a reference pulse 310 by a delay period 312. As shown in FIG. 3, the delay period 312 is different than the delay period 306. In this way, the probability of the pulses for channel 1 interfering with the pulses of channel 2 may be reduced or substantially eliminated.

In addition, each delay period 306 or 312 may be selected to avoid interference between its respective reference and data pulses. For example, each delay period 306 or 312 may be greater than a maximum channel delay spread. This delay spread represents a time interval within which most of the energy from a pulse (e.g., reference pulse 304 or 310) is captured.

FIG. 4 illustrates defining different pulse repetition periods for different channels. Referring to channel 1, a second set of pulses 404 follows a first set of pulses 406 by a pulse repetition period 408. Referring to channel 2, a second set of pulses 410 follows a first set of pulses 412 by a pulse repetition period 414. Again, the pulse repetition period 408 is different than the pulse repetition period 414. Again, this enables interference between the two channels to be reduced or substantially eliminated.

The use of different pulse repetition periods is applicable to a variety of pulse-based communication systems. The specific example of FIG. 4 relates to a transmitted reference system. Here, the reference pulse to data pulse delay period is represented by the arrows 402. As will be discussed in more detail below, the same delay period 402 or different delay periods 402 may be defined for the two channels.

Figure 5:
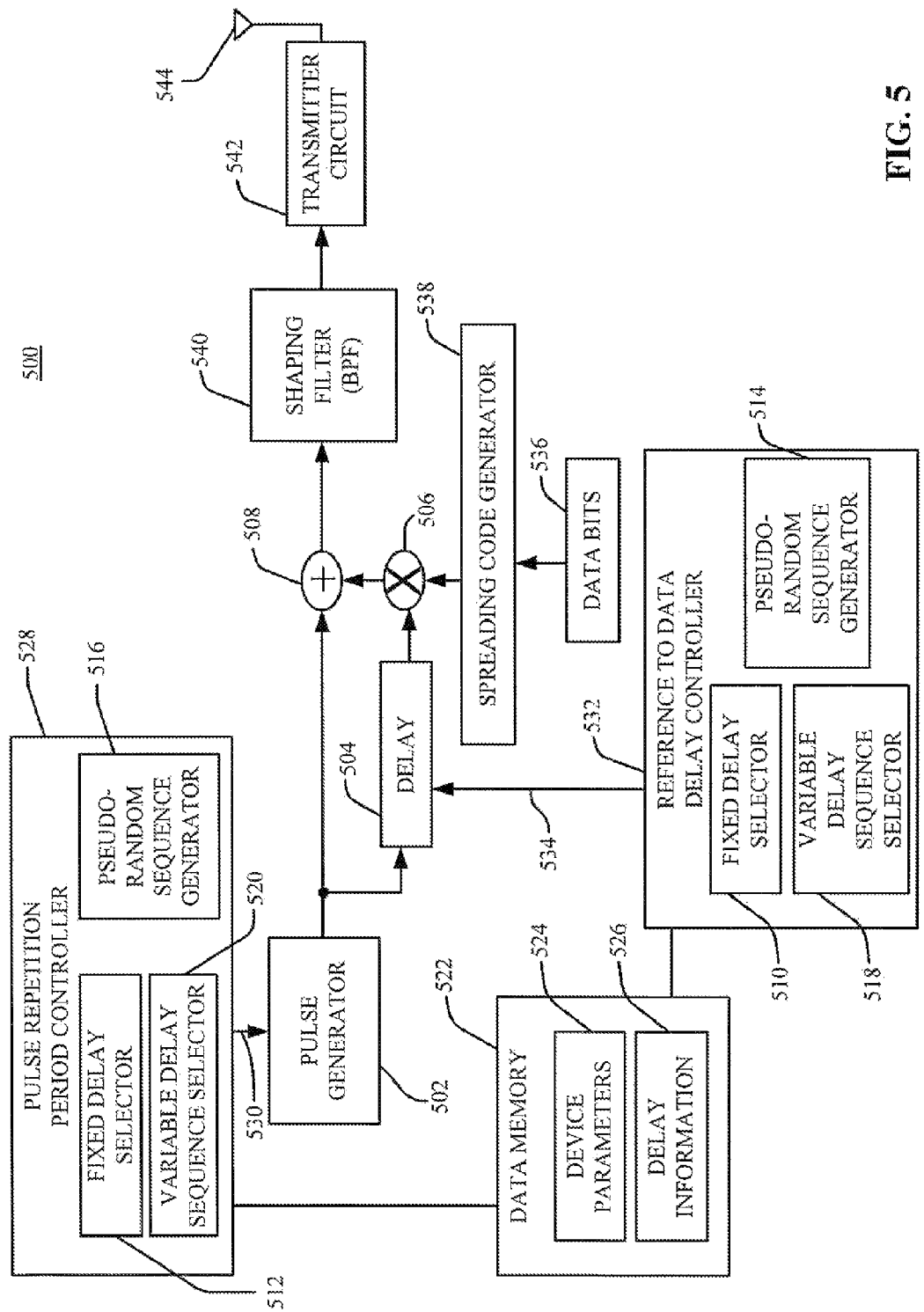
FIG. 5 is a simplified block diagram of several exemplary aspects of a transmitter for a pulse-based system.
Figure 6:
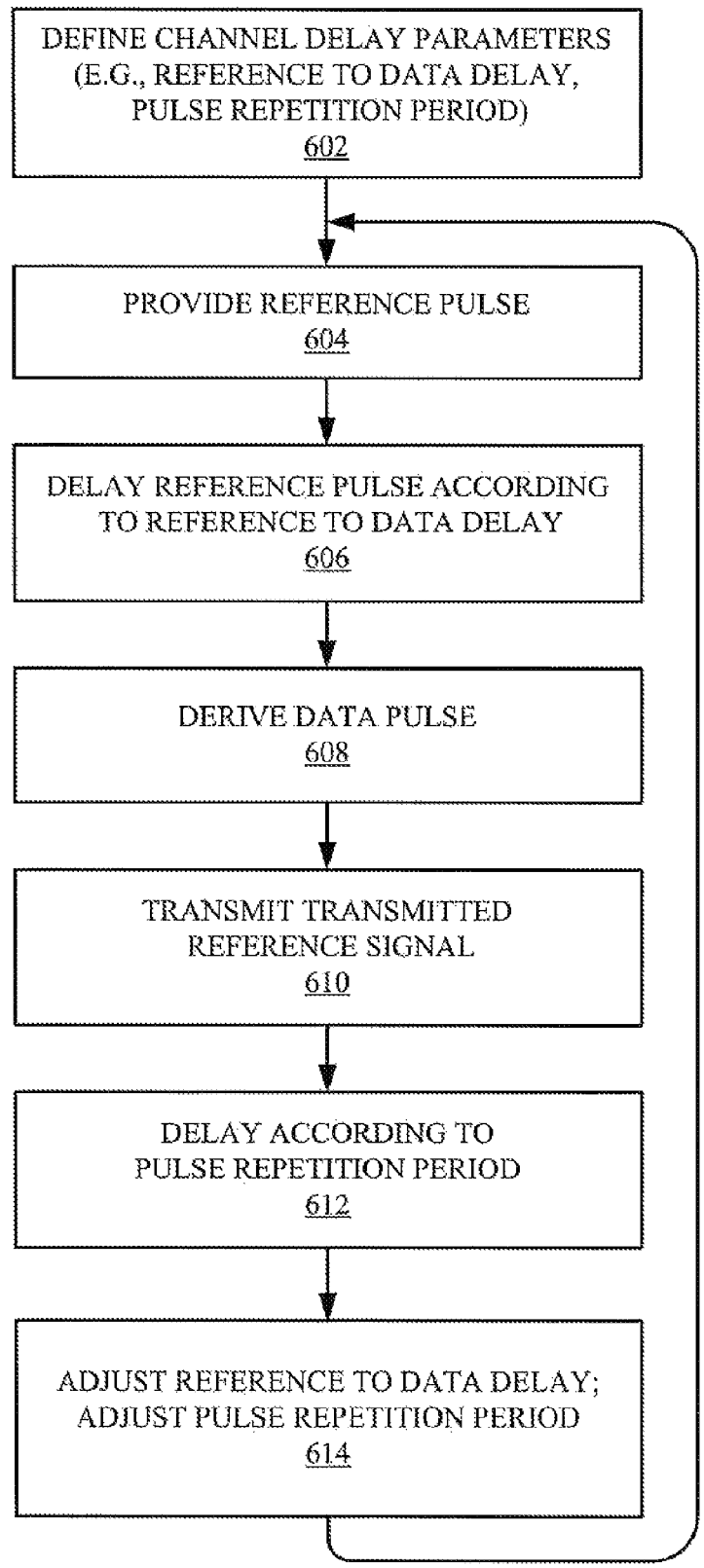
FIG. 6 is a flowchart of several exemplary aspects of operations that may be performed to transmit pulse-based signals.
Figure 7:
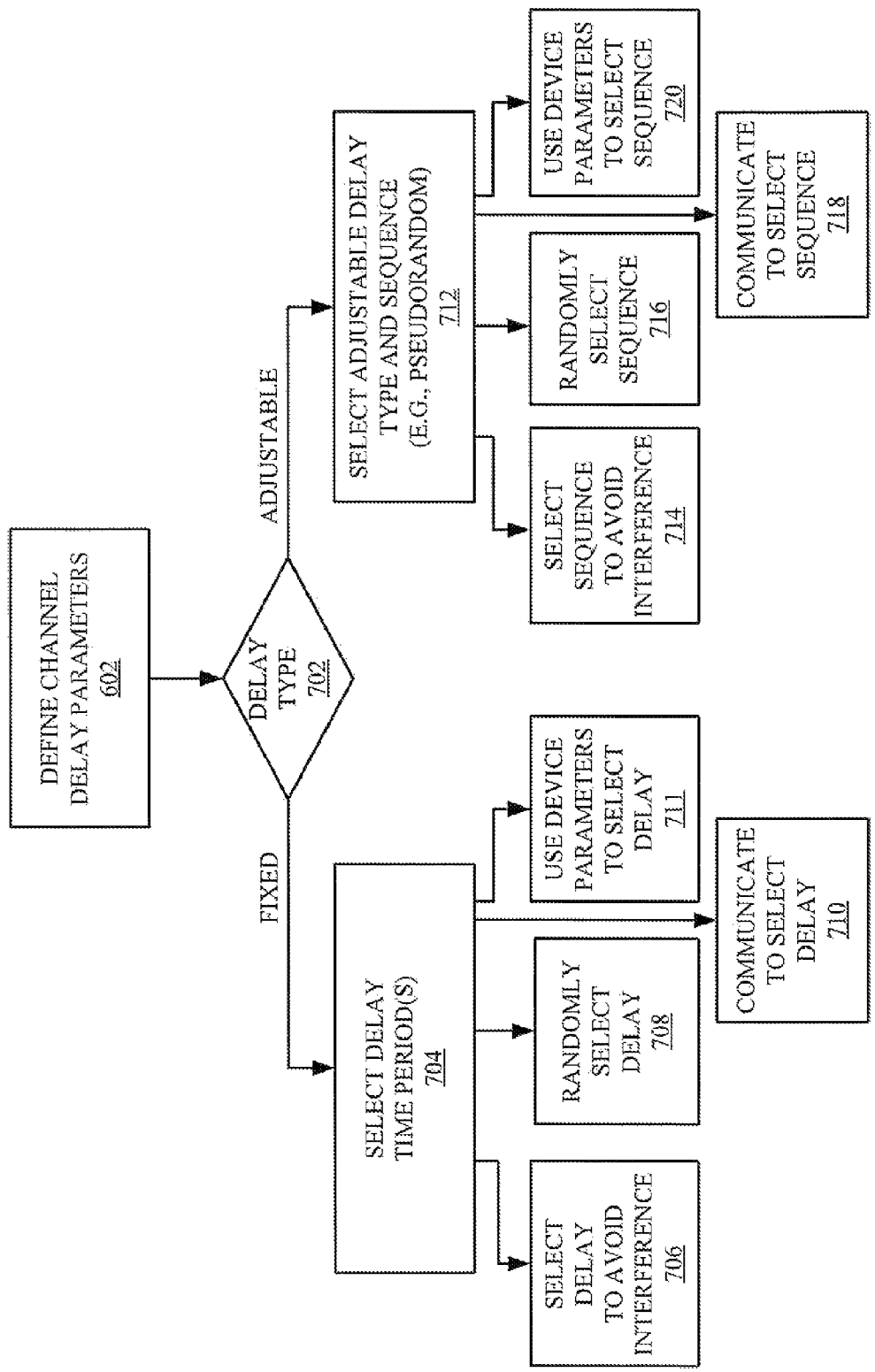
FIG. 7 is a flowchart of several exemplary aspects of operations that may be performed to define delay periods for transmitted or received pulses.
Figure 8:
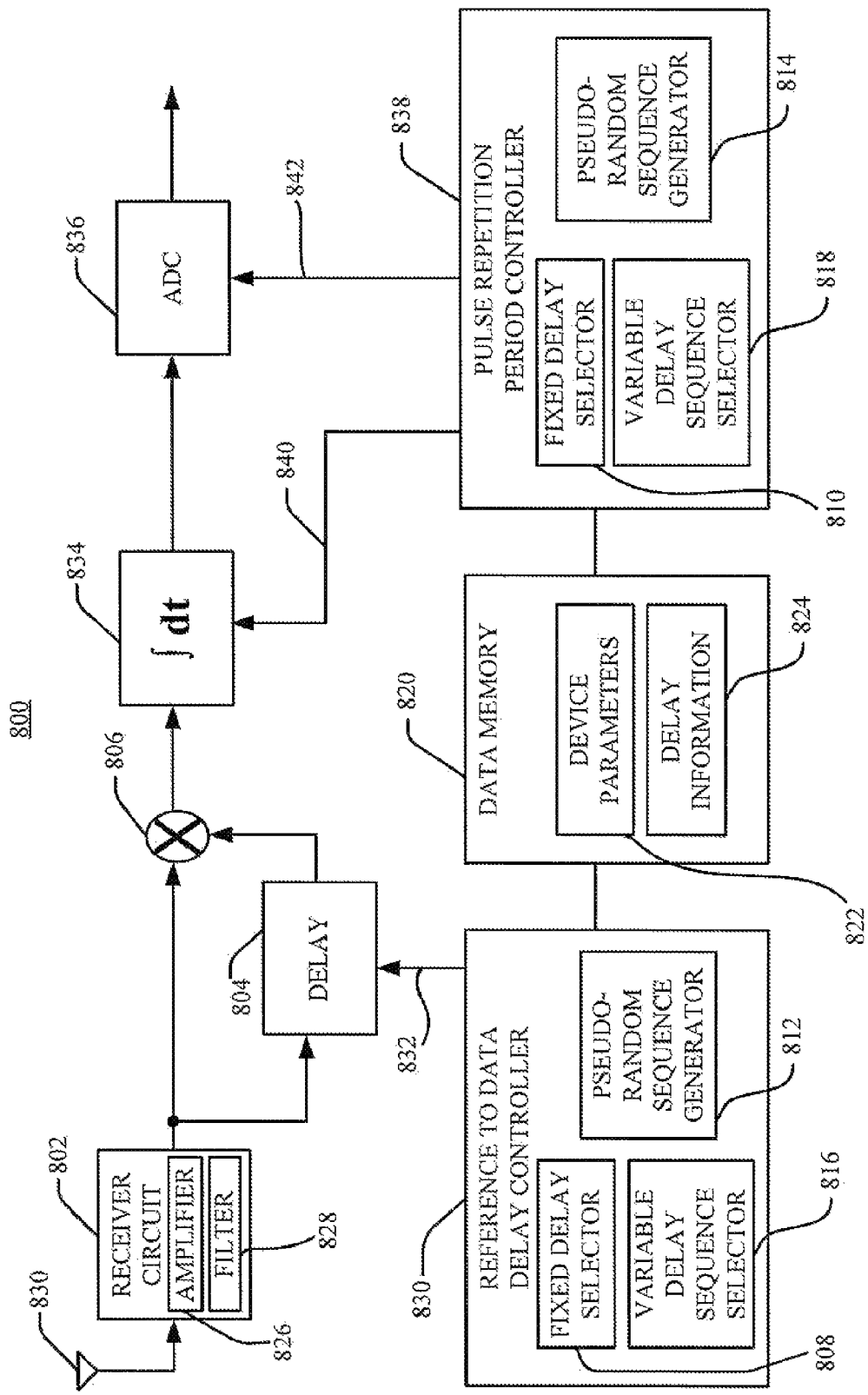
FIG. 8 is a simplified block diagram of several exemplary aspects of a receiver for a pulse-based system.
Figure 9:
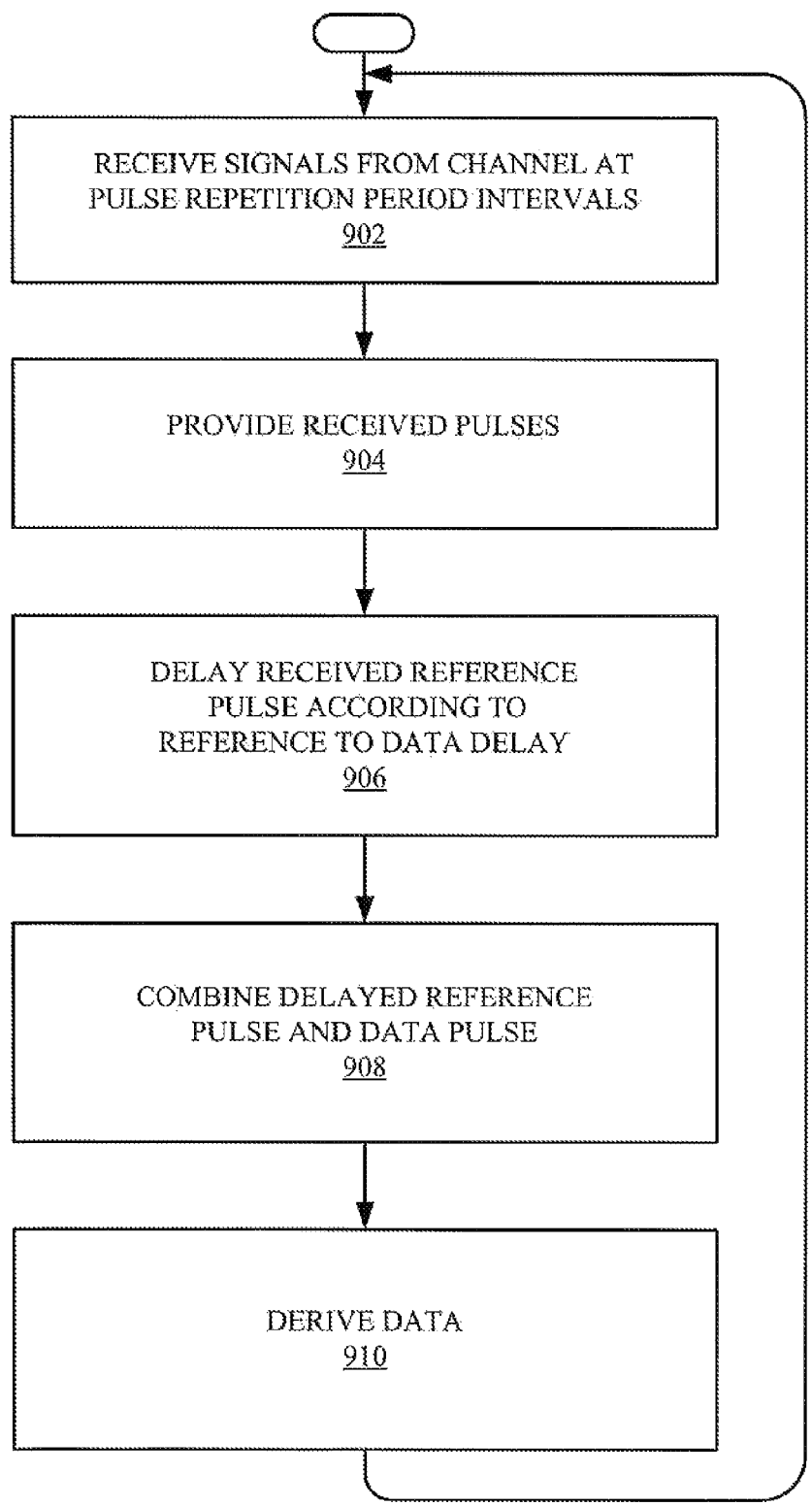
FIG. 9 is a flowchart of several exemplary aspects of operations that may be performed to receive pulse-based signals.

Exemplary components and operations of a wireless system will now be described in conjunction with FIGS. 5-9. FIGS. 5 and 6 relate in some aspects to transmitting transmitted reference signals. FIG. 7 relates to operations that may be performed to define channel delay parameters. FIGS. 8 and 9 relate in some aspects to receiving transmitted reference signals.

FIG. 5 depicts a transmitter 500 including a signal generator (e.g., a pulse generator 502), a delay circuit 504 and a combining circuit (e.g., including a multiplier 506 and an adder 508) adapted to generate pulses. Exemplary operations of the transmitter 500 will be described in conjunction with the flowchart of FIG. 6.

Figure 2:
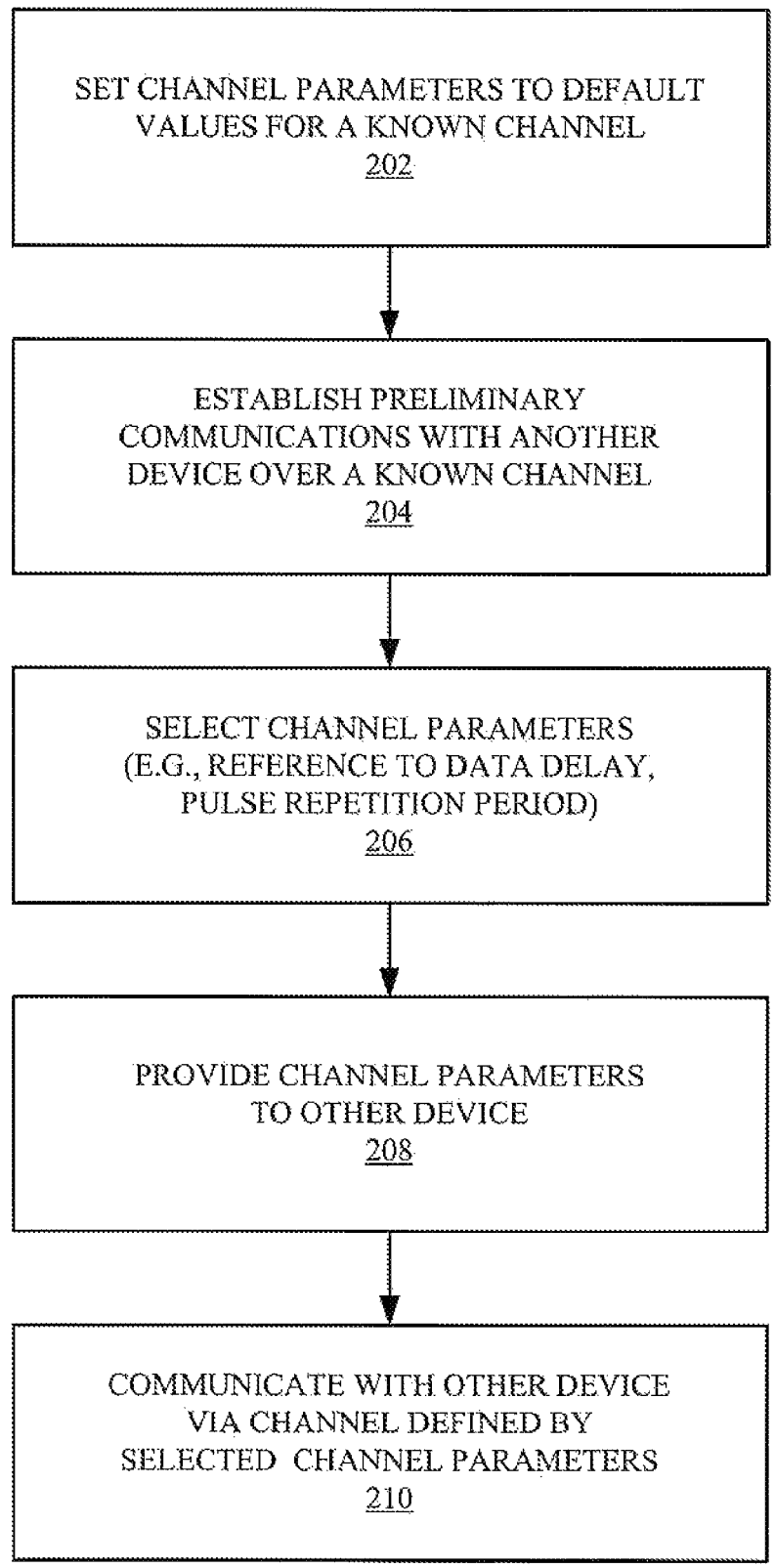
FIG. 2 is a flowchart of several exemplary aspects of operations that may be performed to establish and communicate via one or more channels.

As represented by block 602 in FIG. 6, initially a wireless device including the transmitter 500 may define channel delay parameters, for example, as discussed in conjunction with FIG. 2 above. These operations will be treated in some detail with reference to the flowchart of FIG. 7

Block 602 in FIG. 7 represents that the operations to follow may be performed to define one or more channel delay parameters for each of one or more channels in a communication system. In general, these operations may be performed in conjunction with selecting a reference to data delay, a pulse repetition period or some other parameter that may be used to define a channel. Multiple operations may be performed for each channel. For example, the operations may be performed once to select a fixed or variable reference to data delay and performed another time to select a fixed or variable pulse repetition period for the same channel. These operations may be performed for one or more channels. For example, the parameters for any one channel may be selected as discussed herein to avoid interference with other channels. In addition, the parameters for more than one channel may be selected as discussed herein to avoid interference between these channels or with other channels.

As represented by block 702, a delay parameter for a channel may be a fixed delay or an adjustable delay. As an example of the latter, a delay parameter may be continually adjusted through a range of delay values in accordance with a known sequence. In this case, a receiver having information regarding the sequence may recover data sent using the sequence once the receiver synchronizes to the transmitted sequence.

As represented by block 704, if the delay is fixed the device selects one or more delay time periods for the channel. For example, as will be discussed in more detail below, in a data transmitted reference system that employs binary phase shift keying or some other n-ary phase shift keying, a data pulse will follow a reference pulse by a given delay period. Alternatively, in a transmitted reference system that employs binary pulse position modulation or some other n-ary pulse position modulation, a data pulse will follow a reference pulse by one of a predefined set of different delay periods.

The device may include one or more components adapted to select a delay. For example, the transmitter 500 may include a fixed delay selector 510 adapted to select the reference to data delay time period(s). The receiver 800 may include a similar fixed delay selector 808. In addition, the transmitter 500 may include a fixed delay selector 512 adapted to select a pulse repetition period and the receiver 800 may include a similar fixed delay selector 810. In practice, common fixed delay selectors may be used by the transmitter 500 and the receiver 800. That is, the selectors 510 and 808 may comprise the same selector while the selectors 512 and 810 may comprise the same selector. The corresponding selection process or processes may be performed in various ways as represented, for example, by blocks 706, 708 and 710 of FIG. 7.

In general, a device selects the time period(s) to avoid or reduce the probability of interference with other channels (block 706). For example, the time period(s) selected for different channels may be orthogonal or substantially orthogonal. In this way, pulses for one channel may be prevented from colliding with pulses for another channel. As discussed above, a device may take into account information regarding the parameters of other active or inactive channels when selecting parameters for a new channel. Such information may be acquired, for example, based on prior channels used by the device or based on information provided by other devices (e.g., a peer device or a central controller device).

As represented by block 708, in some applications a device may randomly select the time period(s). This approach may be suitable, for example, in applications where the duty cycle of the signaling is relatively low. Here, there may be a relatively low probability of pulses for one channel colliding with pulses for another channel. Accordingly, random selection of the time period(s) by each device may prove adequate to prevent or reduce the likelihood of collisions.

As represented by block 710, in some applications a device may communicate with another device to select the time period(s). As discussed above, a device may select the time period(s) based on information it obtains from other devices regarding the time period(s) of other channels that are currently active or were previously active in the system. In addition, in some cases two or more devices may negotiate to select the time period(s) in conjunction with an association procedure or some other procedure.

In some aspects, as represented by block 711, a delay may be selected based on one or more parameters (e.g., a device-related parameter). These parameters may relate to one or more of the devices that will be communicating via the channel. For example, a delay may be selected based on one or more of an address of a device, a location of a device, a time of day, a device type, or some other suitable parameter. In this way, one or more devices may select a delay that is (or has a high probability of being) unique with respect to delays selected based on other parameters.

In a typical application, one or more of these parameters may be stored in a data memory (e.g., a register) in the device. For example, a data memory 522 in FIG. 5 may include device parameters 524. Similarly a data memory 820 in FIG. 8 may include device parameters 822. In practice, a common data memory that stores the device parameters may be used by the transmitter 500 and the receiver 800. That is, the data memories 522 and 820 may comprise the same data memory and the parameters 524 and 822 may comprise the same parameters.

Referring now to block 712, in applications that use an adjustable delay, the device may select a type of adjustable delay and, for the selected type, a particular sequence that will be used to adjust the delay. In some applications, a non-random sequence may be selected. This type of sequence may be used, for example, in applications where orthogonality with other channels may be achieved through the selection of the timing and width of the time periods defined by the sequence.

Typically, however, a pseudorandom sequence will be used to adjust the delay. Such a sequence may be implemented as a time hopping sequence or some other suitable type of sequence. To this end, the transmitter 500 in the receiver 800 may incorporate one or more pseudorandom sequence generators. As shown in FIG. 5, a pseudorandom sequence generator 514 may be used to generate a pseudorandom sequence for the reference to data delay. The receiver 800 in FIG. 8 may include a similar pseudorandom sequence generator 812. A pseudorandom sequence generator 516 in the transmitter 500 may be used to generate a pseudorandom sequence for the pulse repetition period. The receiver 800 may include a similar pseudorandom sequence generator 814. In some implementations a common generator may be used for one or more of the pseudorandom sequence generators depicted as separate components of the transmitter 500 and the receiver 800.

Once a particular type of delay is selected, the device may then select a particular sequence for that delay type. Again, the device may include one or more components adapted to select a delay sequence. For example, the transmitter 500 may include a variable delay sequence selector 518 adapted to select the reference to data delay sequence. The receiver 800 may include a similar variable delay sequence selector 816. In addition, the transmitter 500 may include a variable delay sequence selector 520 adapted to select a pulse repetition period sequence. The receiver 800 may include a similar variable delay sequence selector 818. In a similar manner as discussed above, common variable delay sequence selectors may be used by the transmitter 500 and the receiver 800.

The corresponding selection process or processes may be performed in various ways as represented, for example, by blocks 714, 716, 718 and 720. The operations of the blocks 714, 716 and 718 may be similar to the operations of blocks 706, 708, and 710 discussed above.

In some aspects, as represented by block 720, a sequence may be selected based on one or more parameters (e.g., a device-related parameter). As discussed above, such parameters may relate to one or more of the devices that will be communicating via the channel. For example, a pseudorandom sequence may be selected based on one or more of an address of a device, a location of a device, a time of day, a device type, or some other suitable parameter.

Again, one or more of these parameters may be stored in a data memory (e.g., a register) in the device. For example, the data memory 522 in FIG. 5 may include device parameters 524 and the data memory 820 in FIG. 8 may include device parameters 822. In some aspects, a common data memory that stores the device parameters may be used by the transmitter 500 and the receiver 800 as discussed above.

Once the device defines the delay parameters, the device may configure appropriate components to enable transmission and reception of signals in accordance with the selected parameters. For example, in FIG. 5 delay information 526 may include delay parameters such as reference to data delay(s) and/or pulse repetition period(s). Similarly, in FIG. 8 delay information 824 may include the delay parameters. Again, this type of information may be stored in a common data memory and shared by the transmitter 500 and the receiver 800.

Referring again to FIG. 6, as represented by block 604, the pulse generator 502 generates a reference pulse in accordance with the defined a pulse repetition period. In applications that support a programmable or an adjustable pulse repetition period, a pulse repetition controller 528 may provide a control signal 530 to the pulse generator 502 to control the time interval between generated pulses. As discussed above, this time interval may be based on the delay information 526.

As represented by block 606, the delay circuit 504 delays the reference signal in accordance with the defined reference to data delay. In applications that support a programmable or an adjustable reference to data delay, a reference to data delay controller 532 may generate a control signal 534 to control the delay of the delay circuit 504. As discussed above, this delay may be based on the delay information 526.

At block 608 the transmitter 500 derives a data pulse from the delayed reference pulse. For example, the delayed reference pulse may be modulated by data to be transmitted in accordance with a given modulation scheme. In FIG. 5 a data stream consisting of data bits to be transmitted 536 is provided to a spreading code generator 538. In the binary phase shift keying example shown in FIG. 5 the multiplier 506 multiplies the delayed reference pulse with the output (e.g., +1 or −1) of the spreading code generator 538 representative of the data to be transmitted. Alternatively, a phase shifter may be used to modulate the delayed pulse with the data to be transmitted (e.g., the output of the spreading code generator 538) for phase shift keying employing two or more phases (M-PSK with M=2, 3, 4, etc.). In any event, the adder 508 may be used to couple the resultant data pulse to an output path to a shaping filter (e.g., a bandpass filter) 540.

As represented by block 610, a transmitter circuit 542 may then process the transmitted reference signal (including the reference and data pulses) and provide the resultant signal to an antenna 544 for transmission over the medium. As represented by block 612 and as discussed above in conjunction with block 604, the pulse generator 502 will wait to generate another pulse until the end of the defined pulse repetition period.

As represented by block 614, in applications that support an adjustable reference to data delay and/or an adjustable pulse repetition period, the corresponding time interval may be adjusted in accordance with a corresponding sequence. Again, such an adjustment may be initiated upon application of the appropriate control signal 530 and/or 534.

Referring now to FIG. 8, the receiver 800 includes a receiver circuit 802 (e.g., a signal generator), a delay circuit 804 and a combiner circuit (e.g., a multiplier 806) adapted to generate received pulses and process the received pulses to recover transmitted data. Exemplary operations of the receiver 800 will be described in conjunction with the flowchart of FIG. 9. Here, it will be assumed that the receiver has already generated or acquired the channel parameters, for example, as discussed above.

As represented by block 902, the receiver circuit 802 receives signals from the channel at intervals corresponding to the pulse repetition period for that channel. To this end, the receiver circuit 802 includes circuitry (e.g., an amplifier 826 and a filter 828) adapted to receive signals from an antenna 830 and process the signals to provide received reference pulses and data pulses corresponding to the signals sent over the channel (block 904). The circuitry may thus detect pulses in the received signals to generate the received pulses.

As represented by block 906, the delay circuit 804 delays the reference pulse generated at block 904 in accordance with the defined reference to data delay. In applications that support a programmable or an adjustable reference to data delay, a reference to data delay controller 830 may generate a control signal 832 to control the delay of the delay circuit 804. As discussed above, this delay may be based on the delay information 824.

As represented by block 908, the multiplier 806 multiplies the delayed reference pulse with the data pulse that corresponds to that reference pulse. Here, the reference pulse effectively provides a matched filter for recovering the data from the data pulse. In some applications multiple pulses may have been transmitted for each pulse (e.g., using a spreading code) to improve the accuracy of the data recovery. In addition, in some applications several reference pulses may be averaged to reduce the effects of noise. In this way, the characteristics of the effective matched filter may be improved.

As represented by block 910, an integrator 834 integrates the multiplied signal to provide a detected data pulse. In some aspects the operation of the integrator 834 may be based, in part, on the pulse repetition period associated with the channel. For example, a pulse repetition period controller 838 may generate a control signal 840 that is used to turn the integrator 834 on and off at the appropriate times to capture only each data pulse.

In some aspects the detected pulse is fed directly to an analog-to-digital converter ("ADC") 836 that converts the signal to digital data. Here, the controller 838 may generate a control signal 842 that is used to turn the analog-to-digital converter 836 on and off at appropriate times to capture a signal output by the integrator 834 at an appropriate time. By turning off the converter 836 when it is not needed, the power consumed by the converter 836 may be reduced.

Various mechanisms may be employed to maintain synchronization between a transmitter and the receiver 800 to generate the control signals 840 and 842 at the appropriate times. For example, the transmitter may occasionally send timing signals to the receiver 800. Also, a receiver may employ an appropriate time tracking algorithm to maintain synchronization.

In some aspects a peak detector (not shown) may be employed between the integrator 834 and the converter 836. In this case, the converter 836 may simply convert the detected peaks (e.g., positive and negative peaks) to provide the received data. Such a configuration may be used, for example, when precise timing information is not used to control the integrator 834 and/or the converter 836. This may be the case when the timing of the peaks is not known or is not known with a high degree of certainty. In such a case, the control signals 840 and 842 may be much less precise or, in some cases, may not be employed.

It should be appreciated that the components and operations described above in conjunction with FIGS. 5-9 may be adapted to generate and receive other types of signals. For example, the circuits may be modified as will be discussed in conjunction with FIGS. 10-12 to provide an implementation where a common reference pulse is used for multiple channels. In addition, by eliminating the delay circuits and associated operations these components may simply generate and process pulses in accordance with the defined pulse repetition period(s) and the data bits as will be discussed in more detail in conjunction with FIGS. 13 and 14. Furthermore, the circuits may be adapted to generate and process transmitted reference signals embodying different modulation schemes as will be discussed in more detail in conjunction with FIGS. 15 and 16.

Figure 10:
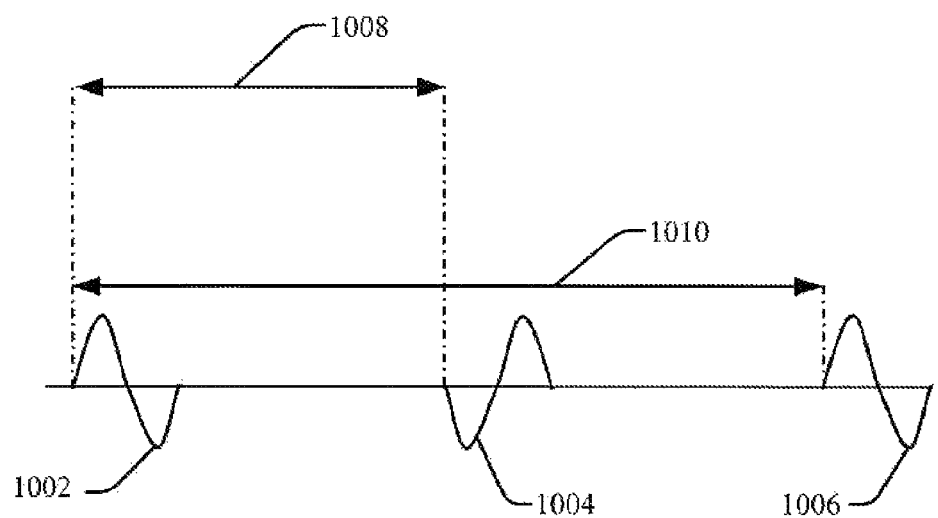
FIG. 10 is a simplified diagram illustrating an example of the use of a common reference pulse for multiple channels.
Figure 11:
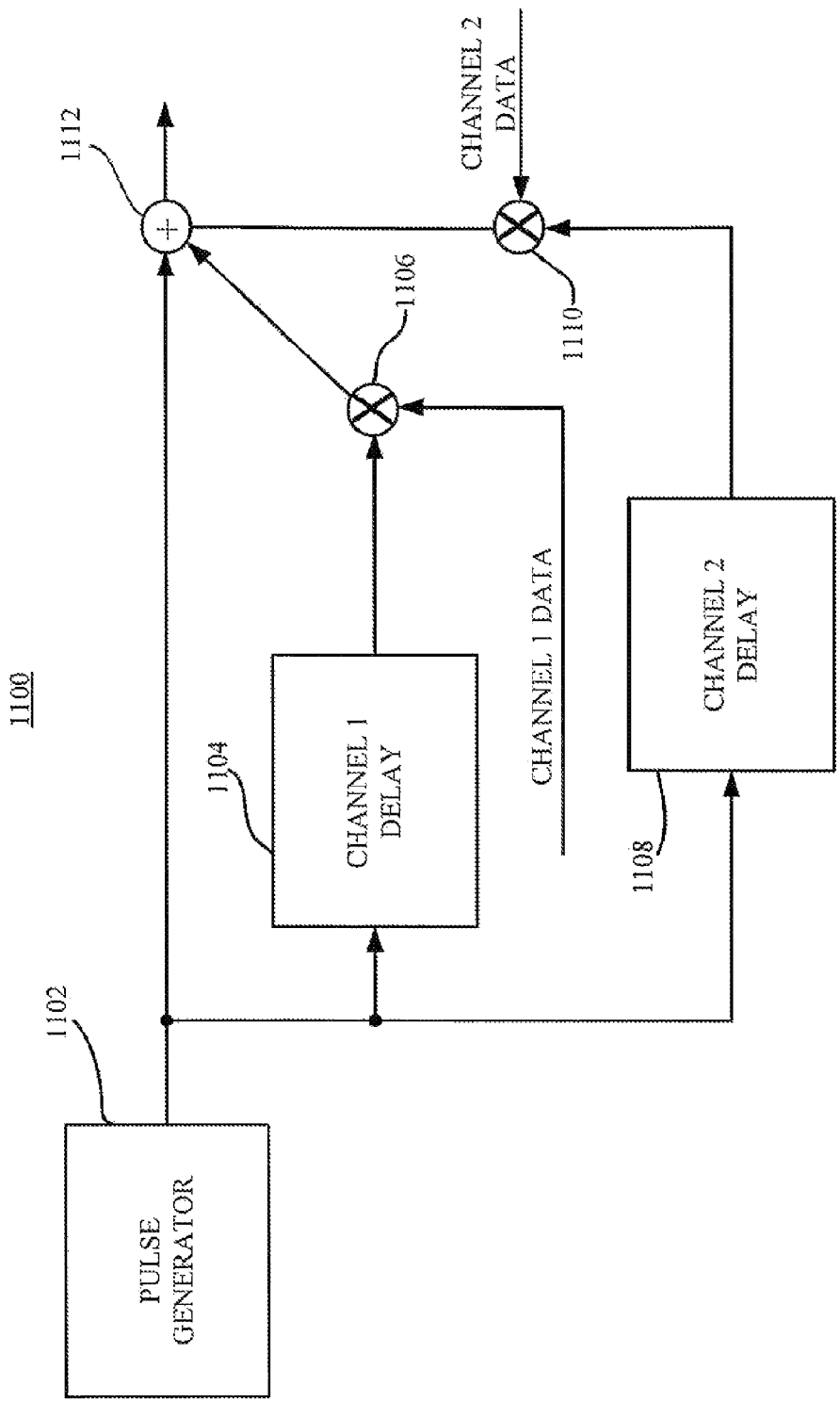
FIG. 11 is a simplified block diagram of several exemplary aspects of a system providing a common reference pulse for multiple channels.
Figure 12:
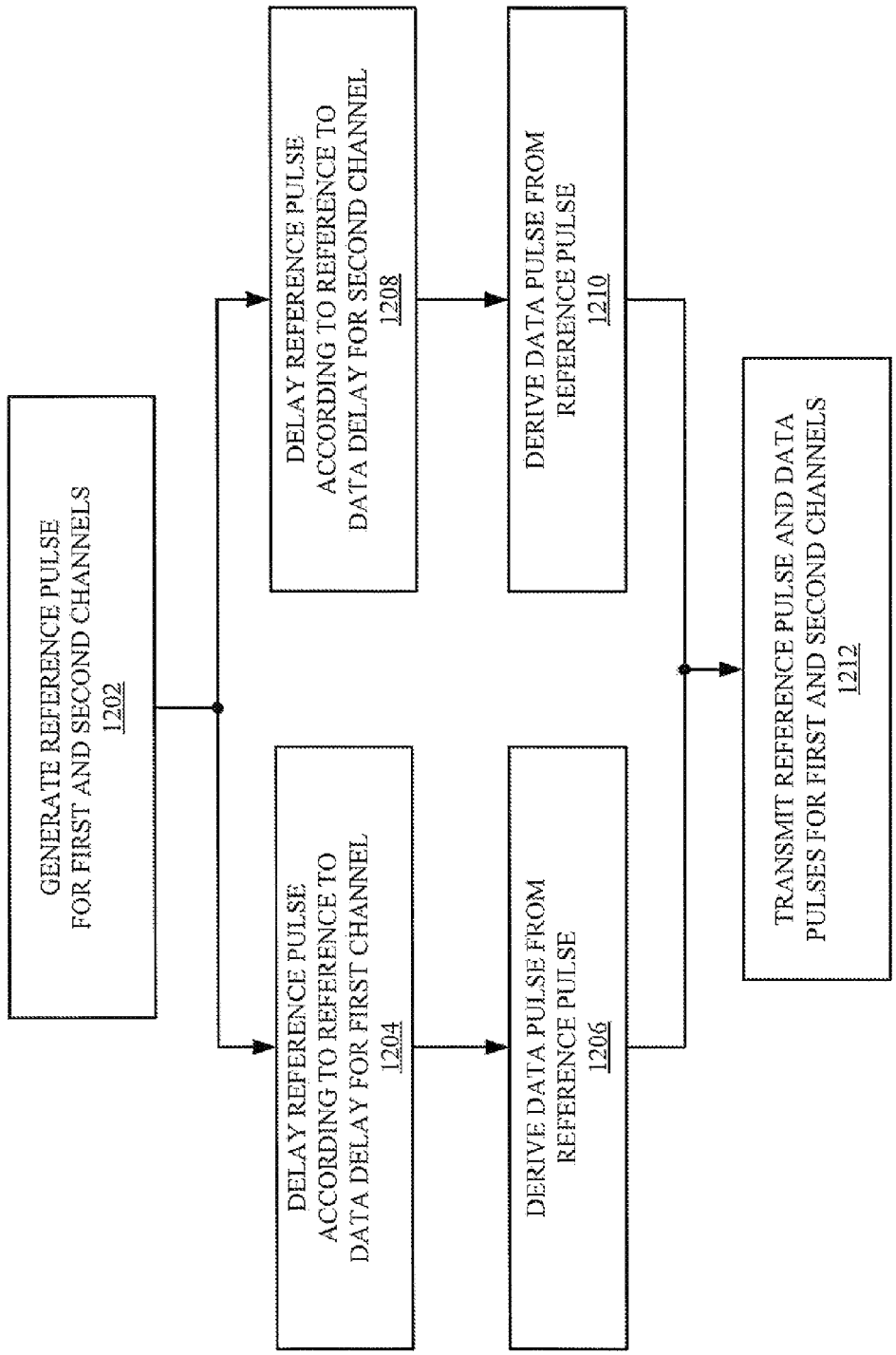
FIG. 12 is a flowchart of several exemplary aspects of operations that may be performed in conjunction with providing a common reference pulse for multiple channels.

Referring now to FIGS. 10-12, in some aspects a common reference pulse may be utilized for multiple channels in the case where a transmitter is simultaneously transmitting data over multiple channels. For example, FIG. 10 depicts a reference pulse 1002 followed by a data pulse 1004 associated with a first channel and by a data pulse 1006 associated with a second channel. Here, a first reference to data delay time period 1008 is defined for the first channel while a second reference to data delay time period 1010 is defined for the second channel. In addition, it should be appreciated that this aspect may be used in conjunction with pulse position modulation and/or an adjustable reference to data delay implemented using an adjustment sequence. Furthermore, this aspect may be used in conjunction with any pulse repetition period technique as taught herein.

FIG. 11 illustrates an example of an adaptation of FIG. 5 that may be used to generate pulses such as those shown in FIG. 10. FIG. 12 describes corresponding operations that may be performed to generate these pulses.

As represented by block 1202 in FIG. 12, a pulse generator 1102 (e.g., pulse generator 502) generates a single reference pulse for the first channel and a second channel. As represented by block 1204, a delay circuit 1104 (e.g., delay circuit 504) delays the reference pulse in accordance with the reference to data delay time period(s) defined for the first channel. As represented by block 1206, a multiplier 1206 (e.g., multiplier 506) and, if applicable, other circuitry (not shown) multiplies the data for the first channel with the delayed reference signal to derive a data pulse for the first channel.

As represented by block 1208, a delay circuit 1108 delays the reference pulse in accordance with the reference to data delay time period(s) defined for the second channel. As represented by block 1210, a multiplier 1110 (and other optional circuitry, not shown) multiplies the data for the second channel with the delayed reference signal to derive a data pulse for the second channel.

As represented by block 1212, an adder 1112 (e.g., similar to adder 508) couples the reference pulse and the data pulses to the transmit output stream. The pulses are then conditioned as necessary and provided to an antenna for transmission over a wireless medium as discussed above. Advantageously, through the use of the above technique, the power consumption of the transmitter may be reduced since fewer references pulses are transmitted.

It should be appreciated that modifications may not need to be made to the receiver 800 of FIG. 8 to process pulses generated in the manner of FIG. 10. For example, a receiver 800 configured to receive pulses on the first channel will configure the delay circuit 804 to delay a period of time corresponding to delay 1008. The data pulse 1006 may then be ignored. Conversely, a receiver 800 configured to receive pulses on the second channel will configure the delay circuit 804 to delay a period of time corresponding to delay 1010. In this case, the data pulse 1004 may be ignored.

Figure 13:
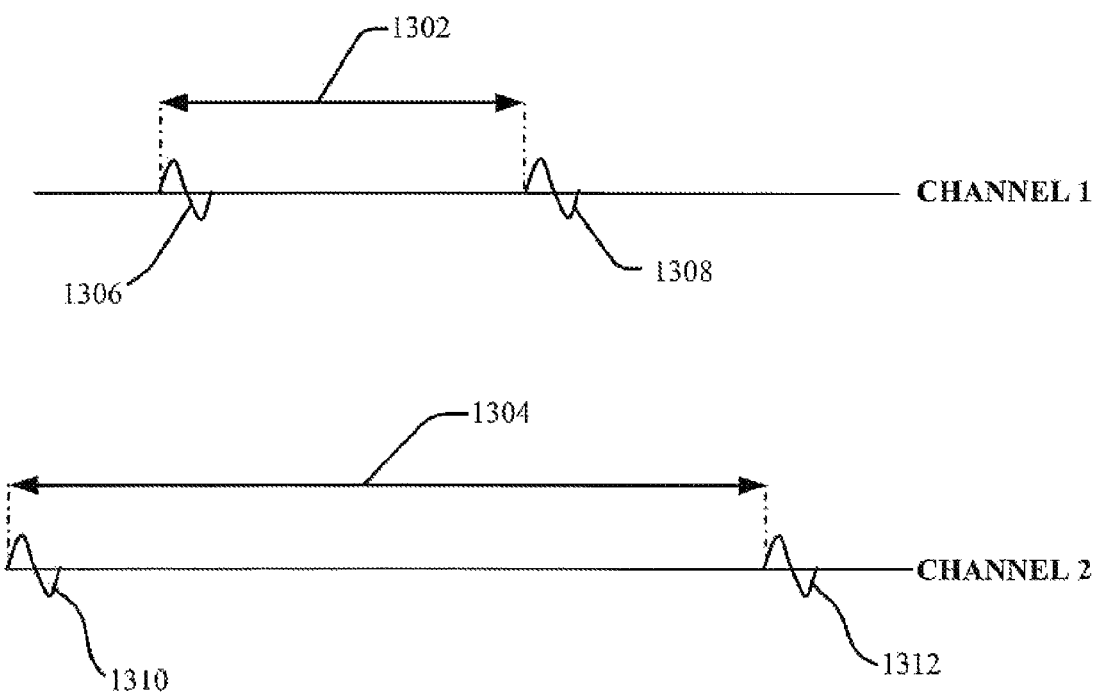
FIG. 13 is a simplified diagram illustrating an example of different pulse repetition periods for different channels.
Figure 14:
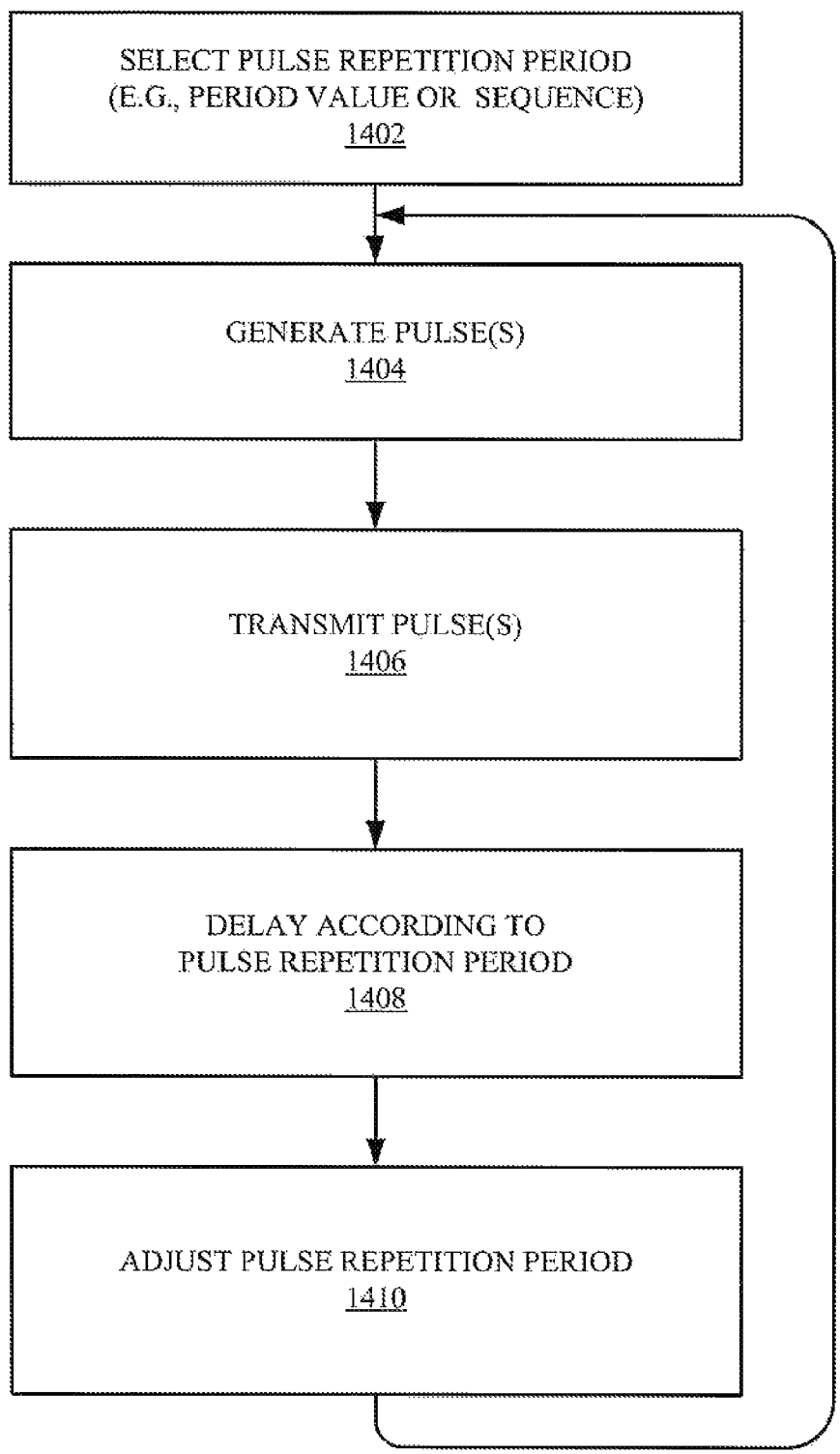
FIG. 14 is a flowchart of several exemplary aspects of operations that may be performed to transmit pulses using different pulse repetition periods.

Referring now to FIGS. 13 and 14, in some aspects multiple access in an ultra-wide band system may be provided by allocating different pulse repetition periods for different channels. FIG. 13 illustrates an example where two channels use different pulse repetition periods 1302 and 1304. Specifically, channel 1 pulses 1306 and 1308 are transmitted at times separated by the pulse repetition period 1302. In channel 2, pulses 1310 and 1312 are transmitted at times separated by the pulse repetition period 1304.

FIG. 13 also illustrates that the pulses may not be transmitted reference pulses. That is, other pulse modulation schemes may be used in conjunction with this ultra-wide band multiple access technique.

Referring now to the operations of FIG. 14, it will be appreciated that the transmitter 500 of FIG. 5 or some other suitable transmitter may be readily adapted to generate signals in accordance with this multiple access technique. As represented by block 1402 a pulse repetition period is defined for a given channel. As represented by block 1404 a pulse generator (e.g., pulse generator 502) generates pulses that may be modulated, for example, by multiplying a data bit stream with the generated pulses (e.g., in a similar manner as discussed above). As represented by block 1406 the generated pulses are provided to a transmitter output circuit that processes and transmits the pulses over a wireless medium. As represented by block 1408 the pulse generator may generate the pulses at intervals defined by the pulse repetition period (e.g., under the control of the controller 528). In addition, as represented by block 1410 the pulse repetition period may be adjusted according to a sequence as discussed herein.

Figure 15:
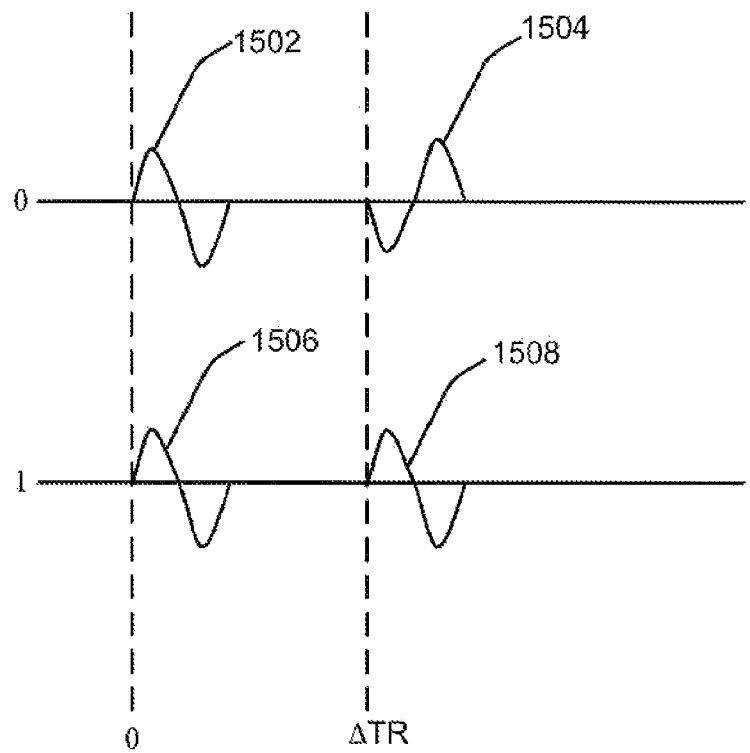
FIG. 15 is a simplified diagram illustrating an example of transmitted reference signals implementing binary phase shift keying.
Figure 16:
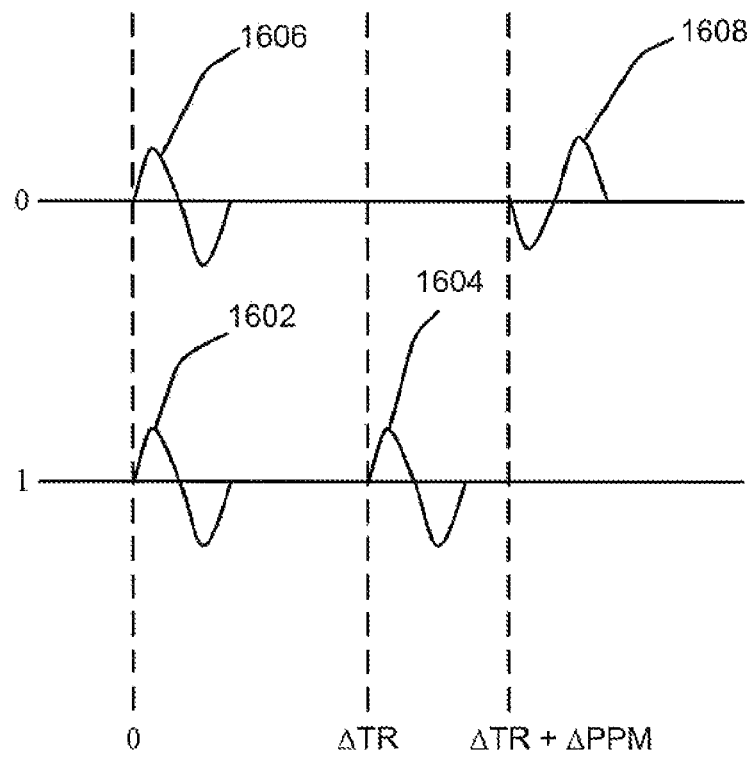
FIG. 16 is a simplified diagram illustrating an example of transmitted reference signals implementing binary pulse position modulation.

In some aspects a device may be configured to support different modulation schemes. FIGS. 15 and 16 illustrate two examples of modulation schemes for a transmitted reference signal. It should be appreciated that these examples are provided for illustration purposes and that other modulation schemes or modifications of these schemes (e.g., other n-ary modulation such as M-PSK, M-PPM, etc.) may be employed in accordance with the teachings herein.

FIG. 15 illustrates an example of a binary phase shift keying modulation scheme. Here, a reference pulse 1502 is followed by a data pulse 1504 having an opposite polarity thereby representing a binary zero. Alternatively, a reference pulse 1506 followed by a data pulse 1508 having the same polarity represents a binary one. To provide data in this format, the transmitter 500 of FIG. 5 may be adapted to, for example, multiply the delayed reference pulse by a −1 or a +1 depending on the value of the data bits 536. In other n-ary modulation schemes the delayed reference pulse may be phase shifted in accordance with other phase values.

FIG. 16 illustrates an example of a binary pulse position modulation scheme. Here, a reference pulse 1602 followed by a data pulse 1604 at an interval ΔTR represents a binary one. Alternatively, a reference pulse 1606 followed by a data pulse 1608 at an interval ΔTR+ΔPPM represents a binary zero. Thus, the reference to data delay is modulated by the ΔPPM value. In other n-ary modulation schemes the reference pulse may be delayed in accordance with other delay values.

To provide data in the format of FIG. 16, the transmitter 500 may be configured to provide different delays for the reference pulse. For example, the transmitter 500 may be adapted to adjust the delay of the delay circuit 504 based on the value of the data bits 536 (and the n-ary scheme). Here, the reference to data delay controller 532 or some other suitable component may be adapted to generate an appropriate delay control signal for the delay circuit 504 in accordance with the data bits 536. In this case, the portion of the transmitter 500 related to the multiplier 506 may be omitted.

To receive data in the format of FIG. 16, the receiver 800 may be configured to detect a received data pulse at different delays with respect to a received reference pulse. For example, the circuit may include a second delay circuit (e.g., with a delay of ΔTR+ΔPPM) and multiplier pair that is connected in parallel with the delay circuit 804 (e.g., with a delay of ΔTR) and the multiplier 806. Thus, one delay circuit and multiplier pair may be used to recover one pulse value (e.g., "−1") and another delay circuit and multiplier pair used to recover another pulse value (e.g., "+1"). Additional circuitry may be used for other n-ary schemes.

The examples of FIGS. 15 and 16 illustrate that a system may provide reference and data pulses separated in time by one or more delay periods. For example, the reference and data pulses may be separated in time by at least one first delay period (e.g., separated by a first fixed period, or separated by ΔTR1 or ΔTR1+ΔPPM) for a first channel. In addition, the system may provide reference and data pulses separated in time by at least one second delay period (e.g., separated by a second fixed period or separated by ΔTR2, or ΔTR2+ΔPPM) for a second channel. Moreover, the delay period(s) associated with the first channel are different than the delay period(s) associated with the second channel.

It should be appreciated that the teachings herein may be applicable to a wide variety of applications other than those specifically mentioned herein. For example, the teachings herein may be applicable to systems utilizing different bandwidths, signal types (e.g., shapes), modulation schemes or signal periodicities. Also, the delay circuit may take various forms including, without limitation, a delay line, one or more delay elements, a transmission line, or any other suitable mechanism that imparts a given delay on a signal. The delay circuit may be fixed or adjustable. In the former case the delay circuit may be fixed to provide a given delay value that is different than the delay value assigned for other delay circuits in a device.

The teachings herein also may be incorporated into a variety of devices. For example, one or more aspects taught herein may be incorporated into a phone (e.g., a cellular phone), a personal data assistant ("PDA"), an entertainment device (e.g., a music or video device), a headset, a microphone, a biometric sensor (e.g., a heart rate monitor, a pedometer, an EKG device, etc.), a user I/O device (e.g., a watch, a remote control, etc.) or any other suitable communication device. Moreover, these devices may have different power and data requirements. Advantageously, the teachings herein may be adapted for use in low power applications (e.g., through the use of a pulse-based signaling scheme) and may support a variety of data rates including relatively high data rates (e.g., through the use of high-bandwidth pulses).

Figure 17:
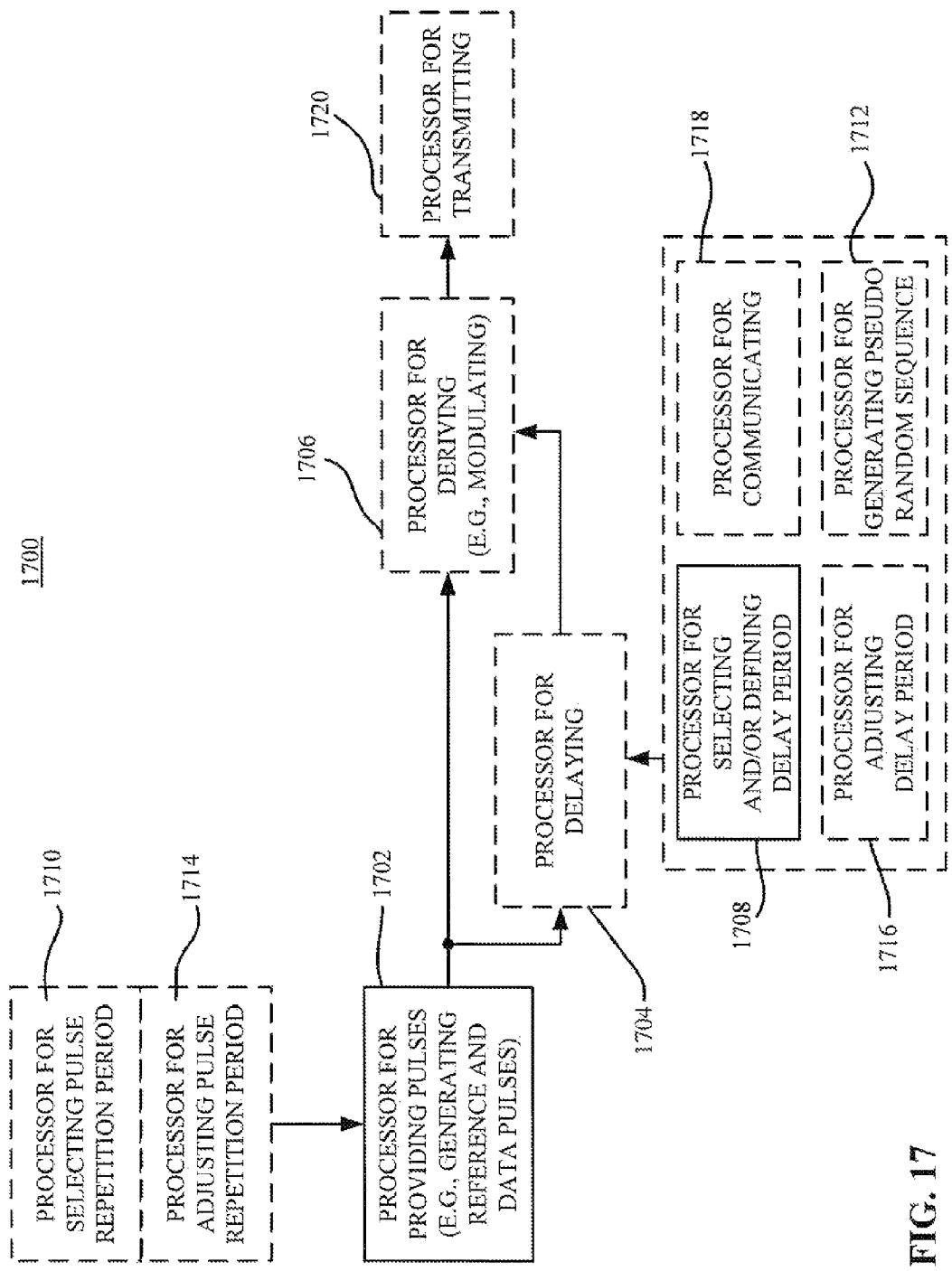
FIG. 17 is a simplified block diagram of several exemplary aspects of an apparatus adapted to transmit signals.
Figure 18:
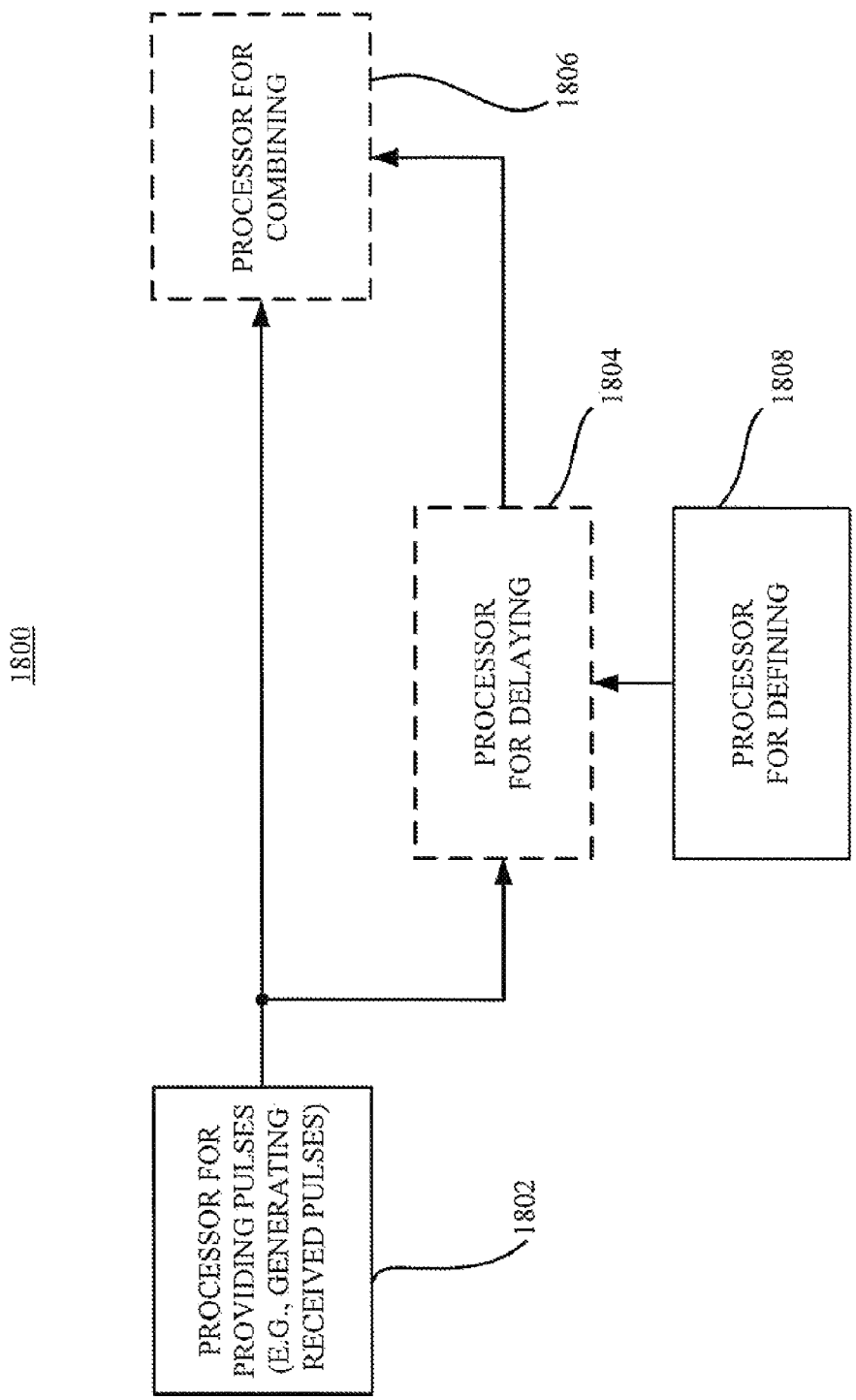
FIG. 18 is a simplified block diagram of several exemplary aspects of an apparatus adapted to receive and generate signals.
Figure 19:
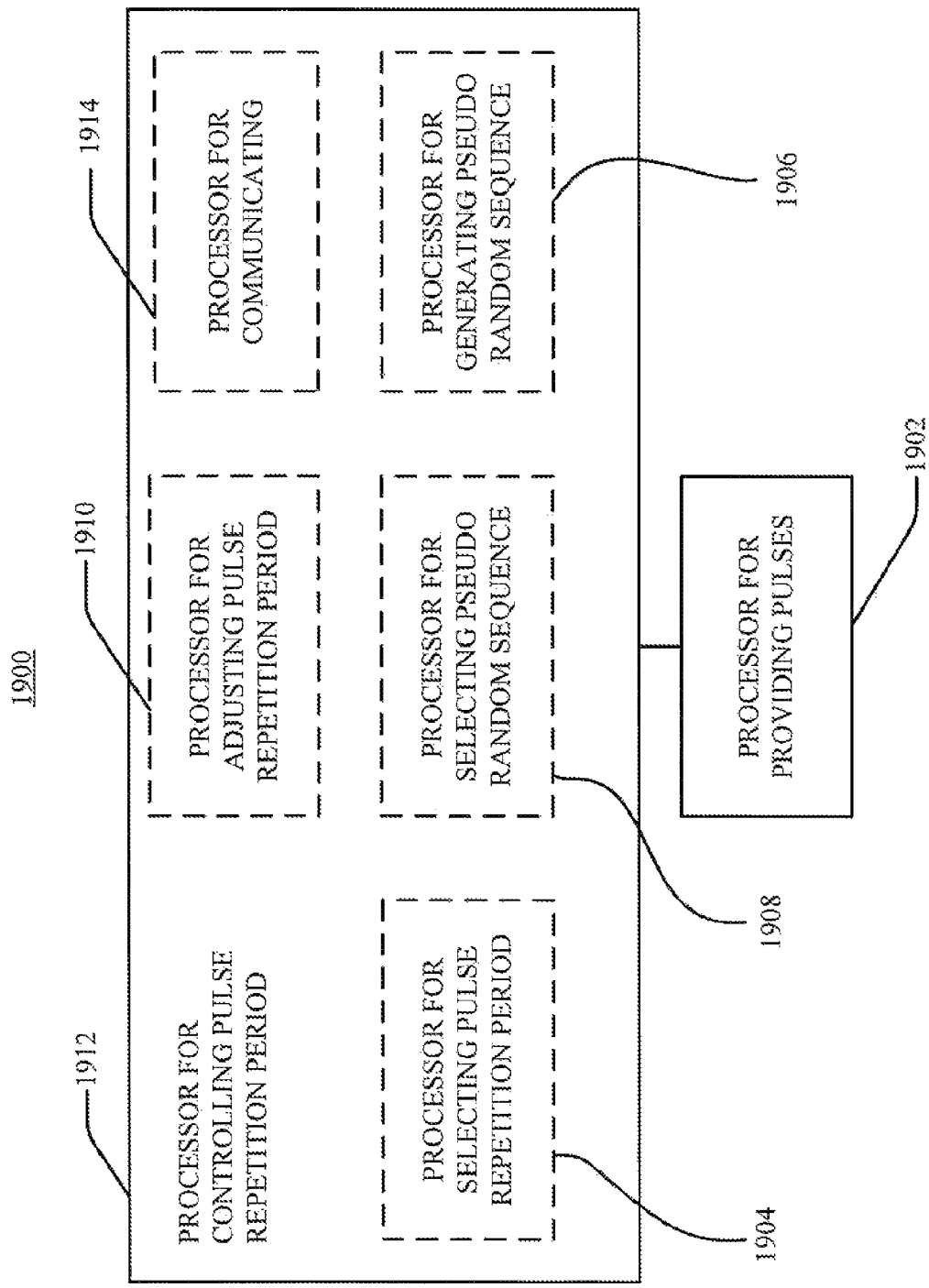
FIG. 19 is a simplified block diagram of several exemplary aspects of an apparatus adapted to provide pulses in accordance with a pulse repetition period.

The components described herein may be implemented in a variety of ways. For example, referring to FIG. 17, an apparatus 1700 includes components 1702, 1704, 1706, 1708, 1710, 1712, 1714, 1716, 1718, and 1720 that may correspond to components 502, 504, 506 and 508, 510 and 518, 512 and 520, 514, 528, 532, 532, and 540 and 542, respectively, of transmitter 500 in FIG. 5. In FIG. 18, an apparatus 1800 includes components 1802, 1804, 1806, and 1808 that may correspond to components 802, 804, 806, and 808 and 816, respectively, in FIG. 8. An apparatus 1900 in FIG. 19 includes components 1902, 1904, 1906, 1908, 1910, 1912, and 1914 that may correspond to components 502, 512 and 520, 516, 520, 528, 528, and 528, respectively, in FIG. 5. FIGS. 17-19 illustrate that in some aspects these components may be implemented via appropriate processor components. These processor components may in some aspects be implemented, at least in part, using structure as taught herein. In some aspects the components represented by dashed boxes are optional.

In addition, the components and functions represented by FIGS. 17-19, as well as other components and functions described herein, may be implemented using any suitable means. Such means also may be implemented, at least in part, using corresponding structure as taught herein. For example, in some aspects means for providing or generating pulses may comprise a pulse generator, means for delaying may comprise a delay circuit, means for deriving or modulating may comprise a modulator, means for selecting or defining may comprise a selector, means for generating may comprise a generator, means for adjusting may comprise an adjuster, means for communicating may comprise a communication circuit, means for transmitting may comprise a transmitter, means for generating received pulses may comprise a receiver circuit, means for combining may comprise a combiner, and means for controlling a comprise a controller. One or more of such means also may be implemented in accordance with one or more of the processor components of FIGS. 17-19.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware, various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. An exemplary storage medium may be coupled to a machine such as, for example, a computer/processor (which may be referred to herein, for convenience, as a "processor") such the processor can read information (e.g., code) from and write information to the storage medium. An exemplary storage medium may be integral to the processor. The processor and the storage medium may reside in an ASIC. The ASIC may reside in user equipment. In the alternative, the processor and the storage medium may reside as discrete components in user equipment.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A multiple access method for a transmitted reference system, comprising:
   defining at least one first delay period between a reference pulse and a data pulse associated with a first channel;
   providing a reference pulse and a data pulse separated in time in accordance with the at least one first delay period, wherein the at least one first delay period is different than at least one second delay period associated with a second channel of the transmitted reference system; and
   providing pulses for the first channel that are separated in time by a first pulse repetition period, wherein the first pulse repetition period is different than a second pulse repetition period associated with the second channel.

2. The method of claim 1, further comprising selecting at least one of a group consisting of the at least one first delay period and the at least one second delay period, such that pulses associated with the first channel do not interfere with pulses associated with the second channel.

3. The method of claim 1, further comprising randomly selecting at least one of a group consisting of the at least one first delay period and the at least one second delay period.

4. The method of claim 1, further comprising communicating with a communication device to select at least one of the group consisting of the at least one first delay period and the at least one second delay period.

5. The method of claim 1, wherein the at least one first delay period is adjustable.

6. The method of claim 5, further comprising adjusting the at least one first delay period such that pulses associated with the first channel do not interfere with pulses associated with the second channel.

7. The method of claim 5, further comprising using pulse position modulation to adjust the at least one first delay period.

8. The method of claim 5, further comprising adjusting the at least one first delay period in accordance with a first pseudorandom sequence, wherein the at least one second delay period is adjusted in accordance with a second pseudorandom sequence that is different than the first pseudorandom sequence.

9. The method of claim 8, further comprising selecting the first pseudorandom sequence to reduce interference between pulses associated with the first channel and pulses associated with the second channel.

10. The method of claim 8, further comprising generating the first pseudorandom sequence in accordance with a first set of device parameters, wherein the second pseudorandom sequence is generated in accordance with a second set of device parameters.

11. The method of claim 1, further comprising selecting the first pulse repetition period such that pulses associated with the first channel do not interfere with pulses associated with the second channel.

12. The method of claim 1, further comprising randomly selecting the first pulse repetition period.

13. The method of claim 1, wherein the first pulse repetition period is adjustable.

14. The method of claim 13, further comprising adjusting the first pulse repetition period such that pulses associated with the first channel do not interfere with pulses associated with the second channel.

15. The method of claim 13, further comprising adjusting the first pulse repetition period in accordance with a first pseudorandom sequence, wherein the second pulse repetition period is adjusted in accordance with a second pseudorandom sequence that is different than the first pseudorandom sequence.

16. The method of claim 15, further comprising generating the first pseudorandom sequence in accordance with a first set of device parameters, wherein the second pseudorandom sequence is generated in accordance with a second set of device parameters.

17. The method of claim 1, wherein a bandwidth of each channel is at least 500 MHz.

18. The method of claim 1, wherein providing the reference and data pulses further comprises:
   generating a reference pulse for transmission over the first channel;
   delaying the generated reference pulse in accordance with the at least one first delay period; and
   modulating the delayed reference pulse to provide a data pulse for transmission over the first channel.

19. The method of claim 1, wherein providing the reference and data pulses further comprises generating a received reference pulse and a received data pulse from signals received via the first channel.

20. The method of claim 19, further comprising:
delaying the received reference pulse in accordance with the at least one first delay period to generate a delayed reference pulse; and
combining the delayed reference pulse and the received data pulse to demodulate the received data pulse.

21. A multiple access method for a transmitted reference system, comprising:
defining at least one first delay period between a reference pulse and a data pulse associated with a first channel; and
providing a reference pulse and a data pulse separated in time in accordance with the at least one first delay period, wherein the at least one first delay period is different than at least one second delay period associated with a second channel of the transmitted reference system, wherein providing the reference and data pulses further comprises:
generating a reference pulse associated with both the first channel and the second channel; and
deriving a data pulse associated with the first channel from the generated reference pulse;
the method further comprising deriving a data pulse associated with the second channel from the generated reference pulse.

22. The method of claim 21, further comprising:
transmitting the generated reference pulse at a first time;
transmitting the data pulse associated with the first channel at a second time, wherein the second time follows the first time by the at least one first delay period; and
transmitting the data pulse associated with the second channel at a third time, wherein the third time follows the first time by the at least one second delay period.

23. An apparatus for providing multiple access for a transmitted reference system, comprising:
at least one circuit adapted to provide reference pulses associated with a first channel of the transmitted reference system; and
at least one delay circuit adapted to delay the reference pulses in accordance with at least one first delay period associated with the first channel, wherein the at least one first delay period is different than at least one second delay period associated with a second channel of the transmitted reference system; and
at least one pulse repetition controller adapted to define a first pulse repetition period associated with the first channel, wherein the first pulse repetition period is different than a second pulse repetition period associated with the second channel.

24. The apparatus of claim 23, further comprising at least one selector adapted to select at least one of a group consisting of the at least one first delay period and the at least one second delay period, such that pulses associated with the first channel do not interfere with pulses associated with the second channel.

25. The apparatus of claim 23, wherein the at least one selector is further adapted to communicate with a communication device to select at least one of a group consisting of the at least one first delay period and the at least one second delay period.

26. The apparatus of claim 23, wherein the at least one first delay period is adjustable.

27. The apparatus of claim 26, further comprising at least one delay controller adapted to adjust the at least one first delay period such that pulses associated with the first channel do not interfere with pulses associated with the second channel.

28. The apparatus of claim 26, further comprising at least one pseudorandom sequence generator adapted to generate a first pseudorandom sequence, wherein the at least one delay circuit is further adapted to adjust the at least one first delay period in accordance with the first pseudorandom sequence, and wherein the at least one second delay period is adjusted in accordance with a second pseudorandom sequence that is different than the first pseudorandom sequence.

29. The apparatus of claim 28, further comprising at least one data memory adapted to store a first set of device parameters, wherein the at least one pseudorandom sequence generator is further adapted to generate the first pseudorandom sequence in accordance with the first set of device parameters, and wherein the second pseudorandom sequence is generated in accordance with a second set of device parameters.

30. The apparatus of claim 23, further comprising a selector adapted to select the first pulse repetition period such that pulses associated with the first channel do not interfere with pulses associated with the second channel.

31. The apparatus of claim 23, wherein the first pulse repetition period is adjustable.

32. The apparatus of claim 31, further comprising at least one pseudorandom sequence generator adapted to generate a first pseudorandom sequence, wherein the at least one pulse repetition controller is further adapted to define the first pulse repetition period in accordance with the first pseudorandom sequence, and wherein the second pulse repetition period is defined in accordance with a second pseudorandom sequence that is different than the first pseudorandom sequence.

33. The apparatus of claim 23, wherein a bandwidth of each channel is at least 500 MHz.

34. The apparatus of claim 23, wherein:
the at least one circuit further comprises at least one pulse generator adapted to generate reference pulses for transmission over the first channel; and
the at least one delay circuit is further adapted to delay the generated reference pulses in accordance with the at least one first delay period;
the apparatus further comprising at least one modulator adapted to modulate the delayed reference pulses to generate data pulses for transmission over the first channel.

35. The apparatus of claim 23, wherein:
the at least one circuit further comprises at least one receiver circuit adapted to generate received reference pulses and received data pulses from signals received via the first channel; and
the at least one delay circuit is further adapted to delay the generated reference pulses in accordance with the at least one first delay period;
the apparatus further comprising at least one combiner adapted to combine the delayed reference pulses and the received data pulses to demodulate the received data pulses.

36. An apparatus for providing multiple access for a transmitted reference system, comprising:
at least one circuit adapted to provide reference pulses associated with a first channel of the transmitted reference system; and
at least one delay circuit adapted to delay the reference pulses in accordance with at least one first delay period associated with the first channel, wherein the at least one first delay period is different than at least one second delay period associated with a second channel of the transmitted reference system;

wherein the least one circuit adapted to provide reference pulses further comprises at least one pulse generator adapted to generate a reference pulse associated with both the first channel and the second channel, the apparatus further comprising at least one modulator adapted to derive a data pulse associated with the first channel from the generated reference pulse and to derive a data pulse associated with the second channel from the generated reference pulse.

37. The apparatus of claim 36, further comprising at least one transmitter circuit adapted to:

transmit the generated reference pulse at a first time;

transmit the data pulse associated with the first channel at a second time, wherein the second time follows the first time by the at least one first delay period; and transmit the data pulse associated with the second channel at a third time, wherein the third time follows the first time by the at least one second delay period.

38. An apparatus for providing multiple access for a transmitted reference system, comprising:

means for defining at least one first delay period between a reference pulse and a data pulse associated with a first channel;

means for providing a reference pulse and a data pulse separated in time in accordance with the at least one first delay period, wherein the at least one first delay period is different than at least one second delay period associated with a second channel of the transmitted reference system; and means for providing pulses separated in time by a first pulse repetition period associated with the first channel, wherein the first pulse repetition period is different than a second pulse repetition period associated with the second channel.

39. The apparatus of claim 38, further comprising means for selecting at least one of a group consisting of the at least one first delay period and the at least one second delay period, such that pulses associated with the first channel do not interfere with pulses associated with the second channel.

40. The apparatus of claim 38, further comprising means for communicating with a communication device to select at least one of a group consisting of the at least one first delay period and the at least one second delay period.

41. The apparatus of claim 38, wherein the at least one first delay period is adjustable.

42. The apparatus of claim 41, further comprising means for adjusting the at least one first delay period such that pulses associated with the first channel do not interfere with pulses associated with the second channel.

43. The apparatus of claim 41, further comprising means for adjusting the at least one first delay period in accordance with a first pseudorandom sequence, wherein the at least one second delay period is adjusted in accordance with a second pseudorandom sequence that is different than the first pseudorandom sequence.

44. The apparatus of claim 43, further comprising means for generating the first pseudorandom sequence in accordance with a first set of device parameters, wherein the second pseudorandom sequence is generated in accordance with a second set of device parameters.

45. The apparatus of claim 38, further comprising means for selecting the first pulse repetition period such that pulses associated with the first channel do not interfere with pulses associated with the second channel.

46. The apparatus of claim 38, wherein the first pulse repetition period is adjustable.

47. The apparatus of claim 46, further comprising means for adjusting the first pulse repetition period in accordance with a first pseudorandom sequence, wherein the second pulse repetition period is adjusted in accordance with a second pseudorandom sequence that is different than the first pseudorandom sequence.

48. The apparatus of claim 38, wherein a bandwidth of each channel is at least 500 MHz.

49. The apparatus of claim 38, wherein the means for providing further comprises:

means for generating reference pulses for transmission over the first channel; and means for delaying the generated reference pulses in accordance with the at least one first delay period;

the apparatus further comprising means for modulating the delayed reference pulses to generate data pulses for transmission over the first channel.

50. The apparatus of claim 38, wherein the means for providing further comprises:

means for generating received reference pulses and received data pulses from signals received via the first channel; and means for delaying the generated reference pulses in accordance with the at least one first delay period;

the apparatus further comprising means for combining the delayed reference pulses and the received data pulses to demodulate the received data pulses.

51. An apparatus for providing multiple access for a transmitted reference system, comprising:

means for defining at least one first delay period between a reference pulse and a data pulse associated with a first channel;

means for providing a reference pulse and a data pulse separated in time in accordance with the at least one first delay period, wherein the at least one first delay period is different than at least one second delay period associated with a second channel of the transmitted reference system;

wherein the means for providing further comprises means for generating a reference pulse associated with both the first channel and the second channel, the apparatus further comprising means for deriving a data pulse associated with the first channel from the generated reference pulse and for deriving a data pulse associated with the second channel from the generated reference pulse.

52. The apparatus of claim 51, further comprising means for transmitting:

the generated reference pulse at a first time;

the data pulse associated with the first channel at a second time, wherein the second time follows the first time by the at least one first delay period; and the data pulse associated with the second channel at a third time, wherein the third time follows the first time by the at least one second delay period.

53. A computer-program product for providing multiple access for a transmitted reference system comprising:

a computer-readable medium comprising codes for causing a computer to:

define at least one first delay period between a reference pulse and a data pulse associated with a first channel;

provide a reference pulse and a data pulse separated in time in accordance with the at least one first delay period, wherein the at least one first delay period is different than at least one second delay period associated with a second channel of the transmitted reference system; and provide pulses for the first channel that are separated in time by a first pulse repetition period, wherein the first pulse repetition period is different than a second pulse repetition period associated with the second channel.

54. A headset, comprising:
a transducer adapted to generate audio data; and
a transmitter adapted to transmit the audio data via a first channel, wherein the transmitter comprises:
   at least one circuit adapted to provide reference pulses associated with the first channel; and
   at least one delay circuit adapted to delay the reference pulses in accordance with at least one first delay period associated with the first channel, wherein the at least one first delay period is different than at least one second delay period associated with a second channel; and
   at least one pulse repetition controller adapted to define a first pulse repetition period associated with the first channel, wherein the first pulse repetition period is different than a second pulse repetition period associated with the second channel.

55. A headset, comprising:
a transducer adapted to generate audio data; and
a transmitter adapted to transmit the audio data via a first channel, wherein the transmitter comprises:
   at least one circuit adapted to provide reference pulses associated with the first channel; and
   at least one delay circuit adapted to delay the reference pulses in accordance with at least one first delay period associated with the first channel, wherein the at least one first delay period is different than at least one second delay period associated with a second channel;
   wherein the least one circuit adapted to provide reference pulses further comprises at least one pulse generator adapted to generate a reference pulse associated with both the first channel and the second channel, the transmitter further comprising at least one modulator adapted to derive an audio data pulse associated with the first channel from the generated reference pulse and to derive an audio data pulse associated with the second channel from the generated reference pulse.

56. A sensor, comprising:
a sensing device adapted to generate sensed data; and
a transmitter adapted to transmit the sensed data via a first channel, wherein the transmitter comprises:
   at least one circuit adapted to provide reference pulses associated with the first channel; and
   at least one delay circuit adapted to delay the reference pulses in accordance with at least one first delay period associated with the first channel, wherein the at least one first delay period is different than at least one second delay period associated with a second channel; and
   at least one pulse repetition controller adapted to define a first pulse repetition period associated with the first channel, wherein the first pulse repetition period is different than a second pulse repetition period associated with the second channel.

57. A sensor, comprising:
a sensing device adapted to generate sensed data; and
a transmitter adapted to transmit the sensed data via a first channel, wherein the transmitter comprises:
   at least one circuit adapted to provide reference pulses associated with the first channel; and
   at least one delay circuit adapted to delay the reference pulses in accordance with at least one first delay period associated with the first channel, wherein the at least one first delay period is different than at least one second delay period associated with a second channel;
   wherein the least one circuit adapted to provide reference pulses further comprises at least one pulse generator adapted to generate a reference pulse associated with both the first channel and the second channel, the transmitter further comprising at least one modulator adapted to derive a sensed data pulse associated with the first channel from the generated reference pulse and to derive a sensed data pulse associated with the second channel from the generated reference pulse.

* * * * *